(12) United States Patent
Yamamoto et al.

(10) Patent No.: US 10,423,367 B1
(45) Date of Patent: Sep. 24, 2019

(54) PRINT MANAGEMENT VISUALIZATION METHOD, SYSTEM, AND COMPUTER-READABLE MEDIUM

(71) Applicant: Konica Minolta Laboratory U.S.A., Inc., San Mateo, CA (US)

(72) Inventors: Kazuto Yamamoto, Foster City, CA (US); Ryoichi Yokoohji, San Mateo, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 15/926,215

(22) Filed: Mar. 20, 2018

(51) Int. Cl.
*G06F 3/12* (2006.01)

(52) U.S. Cl.
CPC .......... *G06F 3/1207* (2013.01); *G06F 3/1256* (2013.01); *G06F 3/1262* (2013.01); *G06F 3/1288* (2013.01)

(58) Field of Classification Search
CPC .... G06F 3/1203; G06F 3/1207; G06F 3/1256; G06F 3/1259; G06F 3/1261; G06F 3/1262; G06F 3/1288; G06F 3/1291
See application file for complete search history.

(56) References Cited

U.S. PATENT DOCUMENTS

| | | | | |
|---|---|---|---|---|
| 2002/0030851 A1* | 3/2002 | Wanda | .................. | G06F 3/1285 358/1.15 |
| 2007/0229880 A1* | 10/2007 | Harmon | ................ | G06F 3/1259 358/1.15 |
| 2011/0235115 A1* | 9/2011 | Nishio | .................. | G06F 3/1285 358/1.15 |
| 2016/0075130 A1* | 3/2016 | Landa | .................... | B41J 2/0057 347/103 |
| 2017/0160917 A1* | 6/2017 | Krikke | .................. | G06F 3/1203 |
| 2018/0113655 A1* | 4/2018 | Sawata | ................. | G06F 3/1256 |
| 2018/0143795 A1* | 5/2018 | Masuzawa | ............ | G06F 3/1207 |

\* cited by examiner

*Primary Examiner* — Benny Q Tieu
*Assistant Examiner* — Juan M Guillermety
(74) *Attorney, Agent, or Firm* — Squire Patton Boggs (US) LLP

(57) ABSTRACT

Print shop operations may be visualized graphically to show relationships between a stream of incoming print jobs and a group of available print production devices, such as printing and finishing machines. A visualization process is performed with microservices to generate UI device panes, which form elements of a graphic user interface from which print shop operation can be monitored or controlled. Each microservice corresponds a different one of the print production devices. This can allow for rapid adjustments and customization of the UI, as may be needed due to user feedback, change in user requirements, and introduction of new print production devices to the print shop. Information may be added to the graphic user interface in combination with the UI device panes to facilitate assignment of print jobs to particular print production devices and/or to show which devices can be used sequentially or in parallel to complete the print jobs.

20 Claims, 18 Drawing Sheets

PRINT MANAGEMENT VISUALIZATION METHOD, SYSTEM, AND COMPUTER-READABLE MEDIUM

FIELD

This disclosure relates generally to image processing and, more particularly, to visualization of print management involving multiple printing and/or finishing machines.

BACKGROUND

A print server performs print management to identify printing and finishing machines appropriate for a print job. The requirements of a print job must be matched with capabilities of a machine, and the print job must be transmitted to the selected machine in a manner that can be understood by the machine. In high-speed, high-volume operations, a single print job may be distributed among multiple machines to minimize idle time and bottlenecks in production. The process of selecting appropriate machines can become complicated when the server must match a constant stream of print jobs with a large number of machines. With ever increasing diversity of machines in terms of their capabilities and constraints, it is no surprise that the code for print management programs have become huge and complex, requiring long periods to develop and deploy.

User input by an administrator can assist the print management program to assign machines to a print job when there are multiple machines capable of executing the print job or in response to a machine malfunction. To aid the administrator, the print management program may display a graphic user interface (UI) that gives an overview of available machines and pending print jobs. The design of the UI is critical for minimizing user training time and improving workflow efficiency in a highly dynamic environment, such as in high volume print shop with many different machines. User feedback may reveal potential improvements that can be made to the UI design soon after deployment. User requirements may evolve, prompting a change to the UI design. In addition, UI design requirements may vary greatly from customer to customer.

A problem arises when UI design is embodied within a monolithic software architecture typical of print management programs. Even seemingly minor changes in the program may require long periods of validation to ensure that other processes of the print management program are not adversely affected, which would increase cost and wait time for a customer.

Accordingly, there is a need for a method, system, and program for visualizing print management that can help satisfy increasing demands for rapid deployment of UI design to improve print shop efficiency.

SUMMARY

Briefly and in general terms, the present invention is directed to a method, print system, and non-transitory computer readable medium for print management.

In aspects of the invention, a print management visualization method comprises: receiving, by a main UI application, UI device panes from a plurality of device microservices, each device microservice corresponding to a different one of a plurality of print production devices, each UI device pane comprising print status information for the print production device corresponding to the device microservice from which the UI device pane is received; causing, by the main UI application, display of a main UI comprising the UI device panes; receiving a print job; receiving, by the main UI application, a UI job list from a job management microservice, the UI job list comprising information about the print job; causing, by the main UI application, the UI job list and an assignment indicator to be included in the displayed main UI, the assignment indicator provided by the main UI application and showing that the print job is assigned to one or more of the print production devices.

In aspects of the invention, a print system has one or more print servers in communication with plural print production devices. The system executes a print management program to perform a print management visualization process. The print management visualization process comprises: receiving, by a main UI application, UI device panes from a plurality of device microservices, each device microservice corresponding to a different one of a plurality of print production devices, each UI device pane comprising print status information for the print production device corresponding to the device microservice from which the UI device pane is received; causing, by the main UI application, display of a main UI comprising the UI device panes; receiving a print job; receiving, by the main UI application, a UI job list from a job management microservice, the UI job list comprising information about the print job; causing, by the main UI application, the UI job list and an assignment indicator to be included in the displayed main UI, the assignment indicator provided by the main UI application and showing that the print job is assigned to one or more of the print production devices.

In aspects of the invention, a non-transitory computer readable medium has stored thereon computer readable instructions that, when executed by one or more computer processors of a print system, cause the print system to perform a print management visualization process. The print management visualization process comprises: receiving, by a main UI application, UI device panes from a plurality of device microservices, each device microservice corresponding to a different one of a plurality of print production devices, each UI device pane comprising print status information for the print production device corresponding to the device microservice from which the UI device pane is received; causing, by the main UI application, display of a main UI comprising the UI device panes; receiving a print job; receiving, by the main UI application, a UI job list from a job management microservice, the UI job list comprising information about the print job; causing, by the main UI application, the UI job list and an assignment indicator to be included in the displayed main UI, the assignment indicator provided by the main UI application and showing that the print job is assigned to one or more of the print production devices.

The features and advantages of the invention will be more readily understood from the following detailed description which should be read in conjunction with the accompanying drawings.

DETAILED DESCRIPTION

Figure 1:
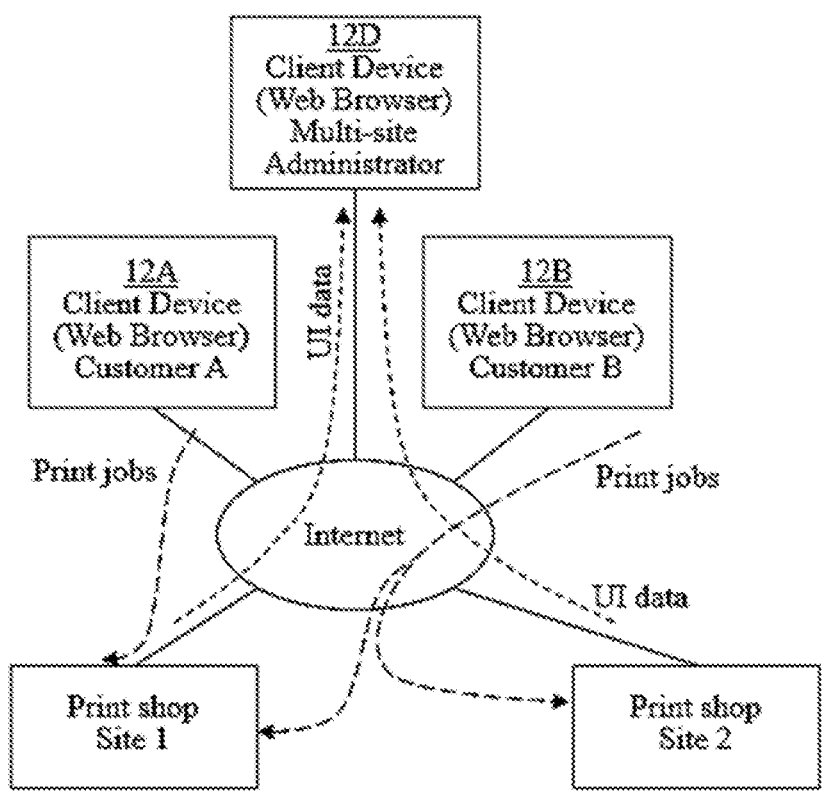
FIG. 1 is a schematic block diagram showing an example system for print management across various client devices and print shop sites.

Referring now in more detail to the example drawings for purposes of illustrating aspects of the invention, wherein like reference numerals designate corresponding or like elements among the several views, there is shown in FIG. 1 example system 10 for print management distributed over a plurality of print shop sites. Each site includes a print server that manages print production devices, such as printing machines and finishing machines.

Figure 2:
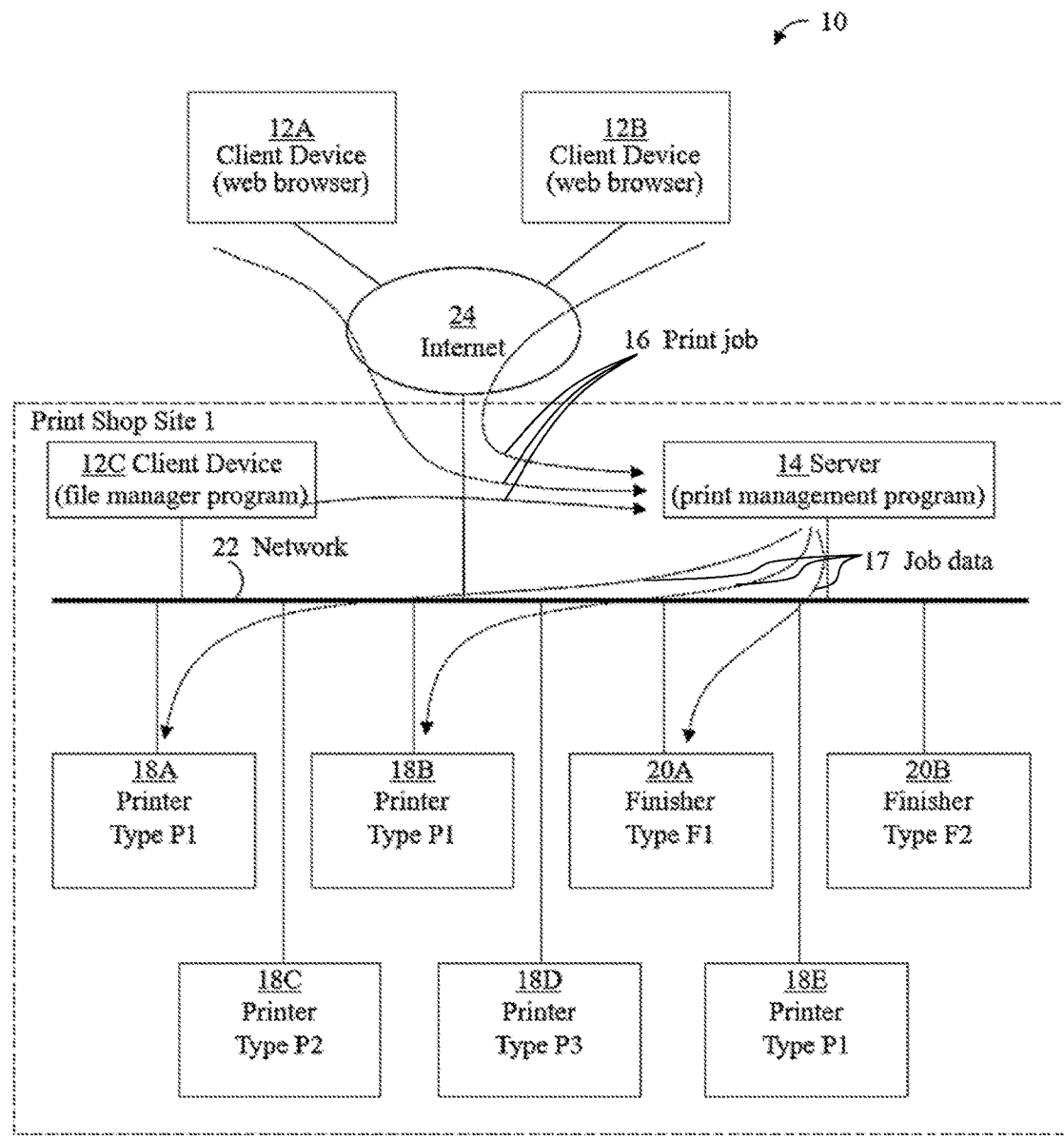
FIG. 2 is a schematic block diagram showing details of an example print shop site that includes a print server managing various printers and finishers.

As shown in FIG. 2, the print shop at the first site includes client device 12C, print server 14 (abbreviated as server 14), and printing machines 18 (abbreviated as printers 18), and finishing machines 20 (abbreviated as finishers 20). Some of these system elements are labeled in the figures using numerals and letters (e.g., 18A, 18B, 18C) to distinguish particular members within the group. Numerals without letters refer to any or all members of the group. The print shop at the second site also has its own client device 12C, server 14, printers 18, and finishers 20.

Client devices 12 communicate with server 14 to have print jobs 16 completed by printers 18 and finishers 20. Each print job 16 can be request to print a single copy of one document, or a request to print multiple copies of one document. Printing and finishing requirements (collectively referred to as print process requirements) in print jobs 16 are not in a format that can be understood and used by printers 18 and finishers 20. Server 14 translates print jobs 16 to job data 17 that have print process requirements in a format that can be understood and used by printers 18 and finishers 20.

A print shop, such as one in an office or building, may house server 14, printers 18, and finishers 20. The print shop can be a commercial establishment that takes print jobs 16 from a variety of organizations, such as hospitals, schools, and financial institutions. The print shop can be a department within a large organization, such as a government agency or large corporation, in need of high speed and high volume printing services. The print shop has client device 12C which can send print jobs 16 to server 14 via network 22, such as a local or wide area network. Other client devices 12A and 12B are located remotely from the print shop and may send print jobs 16 to server 14 via the Internet 24 and network 22. Server 14 sends job data 17 to printers 18 and finishers 20 via network 22.

Figure 3:
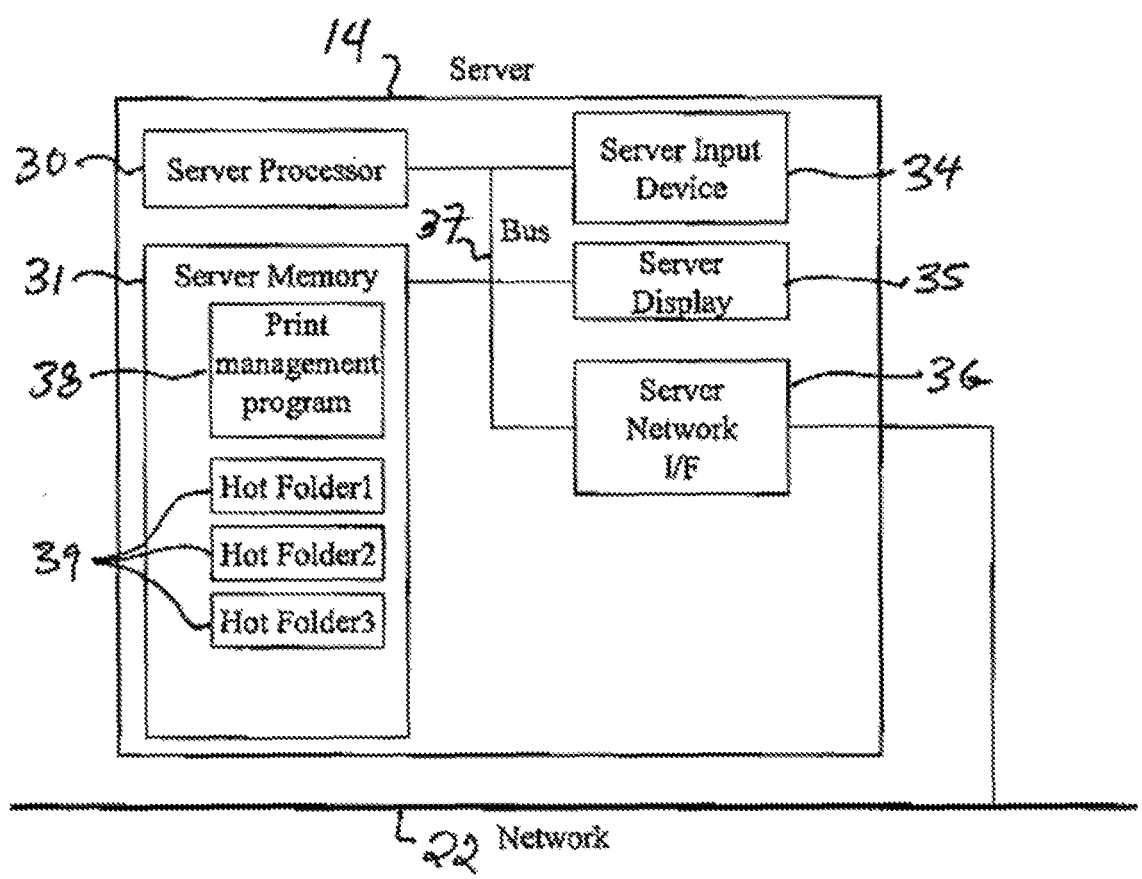
FIG. 3 is a schematic block diagram showing an example print server of FIG. 2.

As shown in FIG. 3, server 14 includes one or more computer processors 30, one or more memory devices 31, one or more input devices 34, server display 35, and server network interface 36 which are interconnected via data communication bus 37. The one or more computer processors 30 are collectively referred to as server processor 30. Server processor 30 includes circuits and electronic components that execute instructions within print management program 38 for performing the methods described herein.

The one or more computer memory devices 31 are collectively referred to as server memory 31. Server memory 31 includes any one or a combination of random-access memory (RAM) modules, read-only memory (ROM) modules, and other electronic data storage devices. Server memory 31 may include a mass storage type of device such as an optical CD or DVD drive, magnetic hard disk drive, or solid-state flash drive. Server memory 31 includes a non-transitory computer readable medium that stores print management program 38.

Server memory 31 stores a file system comprising hot folders 39. Hot folders 39 are monitored by print management program 38, which is executed by server processor 30, such that a new file that arrives in any of the hot folders is processed by print management program 38.

The one or more input devices 34 are collectively referred to as server input device 34. Server input device 34 may include any one or more of a keyboard with buttons, touch-sensitive screen, mouse, electronic pen, microphone, and other means of user input. Server display 35 may include a liquid crystal display, projector, or other type of visual display device. Server input device 34 and display 35 may be used by a server-side user (such as a print shop administrator) to run print management program 38.

Server network interface (I/F) 36 is configured to allow server 14 to communicate with client devices 12, printers 18, and finishers 20 through network 22 and the Internet 24. Server network I/F 36 includes circuits and electronic components configured for data communication through network 22. Server network I/F 36 enables server 14 to receive print jobs 16 from client devices 12.

Figure 4:
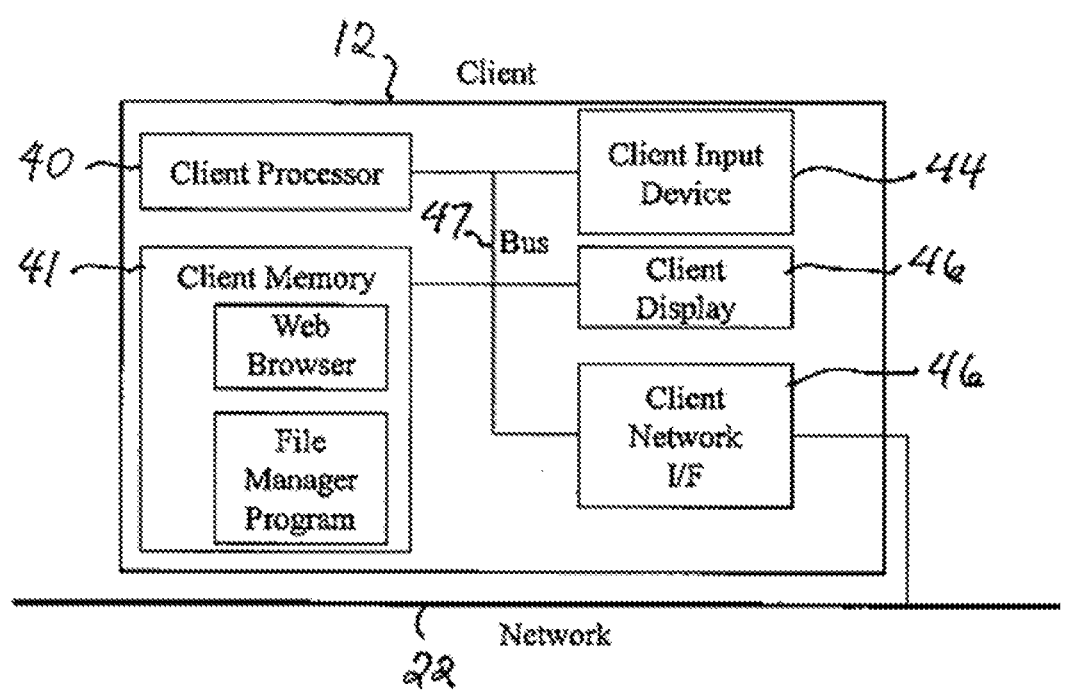
FIG. 4 is a schematic block diagram showing an example client device of FIGS. 1 and 2.

As shown in FIG. 4, client device 12 includes one or more computer processors 40, one or more memory devices 41, one or more input devices 44, client display 45, and client network interface 46 which are interconnected via data communication bus 47. For example, client device 12 can be a computer workstation, laptop computer, tablet, or smartphone. The one or more computer processors 40 are collectively referred to as client processor 40. Client processor 40 includes circuits and electronic components that execute instructions of a web browser program and/or a file manager program.

The one or more computer memory devices 41 are collectively referred to as client memory 41. Client memory 41 includes any one or a combination of random-access memory (RAM) modules, read-only memory (ROM) modules, and other electronic data storage devices. Client memory 41 may include a mass storage type of device such as an optical CD or DVD drive, magnetic hard disk drive, or solid-state flash drive. Client memory 41 includes a non-transitory computer readable medium that optionally stores files associated with a file manager program, such as Windows Explorer. For example, client device 12C (FIG. 2) may run the file manager program to allow a client-side user to drag and drop a printing source file in any one of hot folders 39 (FIG. 3) managed by server 14. The client-side user can be an employee of the print shop. A printing source file contains data that the client-side user wants to have printed. The data may correspond to a photograph, illustration, and/or text. A printing source file can be a single PDF file, JPG file, or other format. The drag and drop operation by the client-side user causes client device 12C to send the printing source file to server 14. By default, each hot folder 39 has associated with it a data set of print process requirements that establishes whether the contents of the printing source file will be subjected to 2-sided printing, for example. Other example print process requirements include, without limitation: paper type, paper size, color or BW printing, output resolution or quality, and finishing such as stapling, collating, hole punching, folding, and stitching.

The non-transitory computer readable medium of client memory 41 may store files associated with a web browser. For example, each of client devices 12A and 12B (FIGS. 1 and 2) may run the web browser, which provides a web-based user interface (UI) with which a client-side user creates print jobs 16. The client-side user can be print shop customer located remotely from the print shop. Each print job 16 from client devices 12A and 12B includes a printing source file and a data set of print process requirements, which are to be used when printing and/or finishing. Such print jobs 16 created by the client-side user are sent by the web browser of client device 12 to server 14.

The one or more input devices 44 are collectively referred to as client input device 44. Client input device 44 may include any one or more of a keyboard with buttons, touch-sensitive screen, mouse, electronic pen, microphone, and other means of user input. Client display 45 may include a liquid crystal display, projector, or other type of visual display device. Client input device 44 and display 45 may be used by the client-side user to interact with the web browser or file manager program of client device 12 to send print job 16 to server 14.

Client network interface (I/F) 46 is configured to allow client device 12 to communicate with server 14 through network 22 and the Internet 24. Client network I/F 46 includes circuits and electronic components configured for data communication through network 22. Client network I/F 46 enables client device 12 to send print jobs 16 to server 14.

Figure 5:
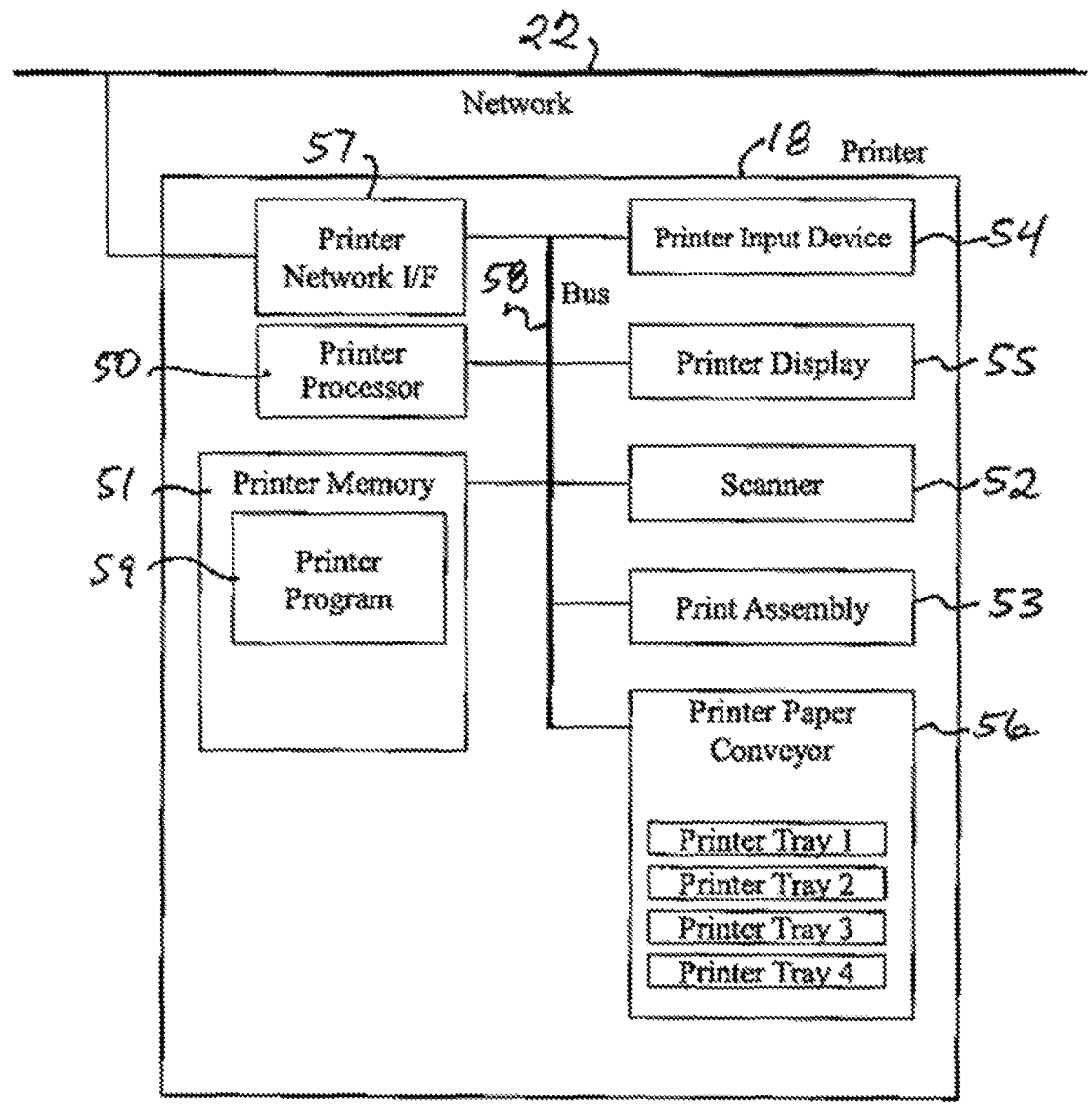
FIG. 5 is a schematic block diagram showing an example printer of FIG. 2.

As shown in FIG. 5, printer 18 includes one or more computer processors 50, one or more memory devices 51, scanner 52, print assembly 53, one or more input devices 54, printer display 55, printer paper conveyor 56, and printer network interface 57. These machine elements of printer 18 are interconnected via data communication bus 58. The one or more computer processors 50 are collectively referred to as printer processor 50. Printer processor 50 includes circuits and electronic components that execute instructions within printer program 59 for controlling the above-mentioned machine elements of printer 18.

The one or more computer memory devices 51 are collectively referred to as printer memory 51. Printer memory 51 includes any one or a combination of random-access memory (RAM) modules, read-only memory (ROM) modules, and other electronic data storage devices. Printer memory 51 may include a mass storage type of device such as an optical CD or DVD drive, magnetic hard disk drive, or solid-state flash drive. Printer memory 51 includes a non-transitory computer readable medium that stores files associated with printer program 59. The non-transitory computer readable medium of printer memory 51 may also store job data 17 received by printer 18 from server 14. Job data 17 includes a job ticket and a printing language file that will be described below.

Scanner 52 reads optical information of images on pages of a physical document placed by a user on printer 18. Light is emitted by scanner 52, which is reflected by the pages. Scanner 52 senses the reflected light and converts it to electrical or digital information, which can be used to print pages that are duplicates of those of the physical document. Other scanning techniques may be used. Some printers 18 may not have a scanner.

For example, print job 16 may involve making one or more duplicate copies of a physical document that is brought to a print shop by a customer. Scanner 12 is used to create a printing source file of the physical document, which is sent by printer 18 to server 14. The customer may tell a print shop employee what the print process requirements are, and then the employee may use the input device of client device 12C or server 14 to create a data set of print process requirements and associate that data set with the printing source file of the physical document. Included in the print process requirements is whether distributed printing (i.e., use of multiple print production devices for a print job) is permitted. Custer printing is a type of distributed printing which uses two or more printers for a print job. Thereafter, server 14 will determine the print production devices (one or more printers 18 and finishers 20, as appropriate) that will execute print job 16.

Print assembly 53 prints images on sheets of paper. The images can be based on information received from scanner 52 or server 14. For example, print assembly 53 generates an electrostatic latent image on a rotating transfer device, which receives toner on the latent image and then transfers the toner to a sheet of paper. Other printing techniques may be used, such as ink jet printing.

The one or more input devices 54 are collectively referred to as printer input device 54. Printer input device 54 may include any one or more of a keyboard with buttons, touch-sensitive screen, mouse, electronic pen, microphone, and other means of user input. Printer display 55 may include a liquid crystal display, projector, or other type of visual display device. Printer input device 54 and display 55 may be used by a user (such as a printer operator working in the print shop) to adjust operation of printer 18.

Printer paper conveyor 56 includes rollers, belts, and mechanical guides that obtain sheets of paper from the appropriate printer trays and conveys the sheets to print assembly 53. The printer trays may contain papers differing in size, material type, and weight. The rollers, belts, and mechanical guides are actuated by various motors that are electrically controlled based on signals generated by printer processor 50. Printer processor 50 determines the appropriate printer tray from which to obtain a sheet of paper based on the print process requirements in print data 17 received by printer 18.

Printer network interface (I/F) 57 is configured to allow printer 18 to communicate with server 14 through network 22. Printer network I/F 57 includes circuits and electronic components configured for data communication through network 22. Printer network I/F 57 enables printer 18 to receive job data 17 from server 14. Each job to a printer includes a printing language file (discussed below) and a job ticket that defines print process requirements relevant to that printer.

Figure 6:
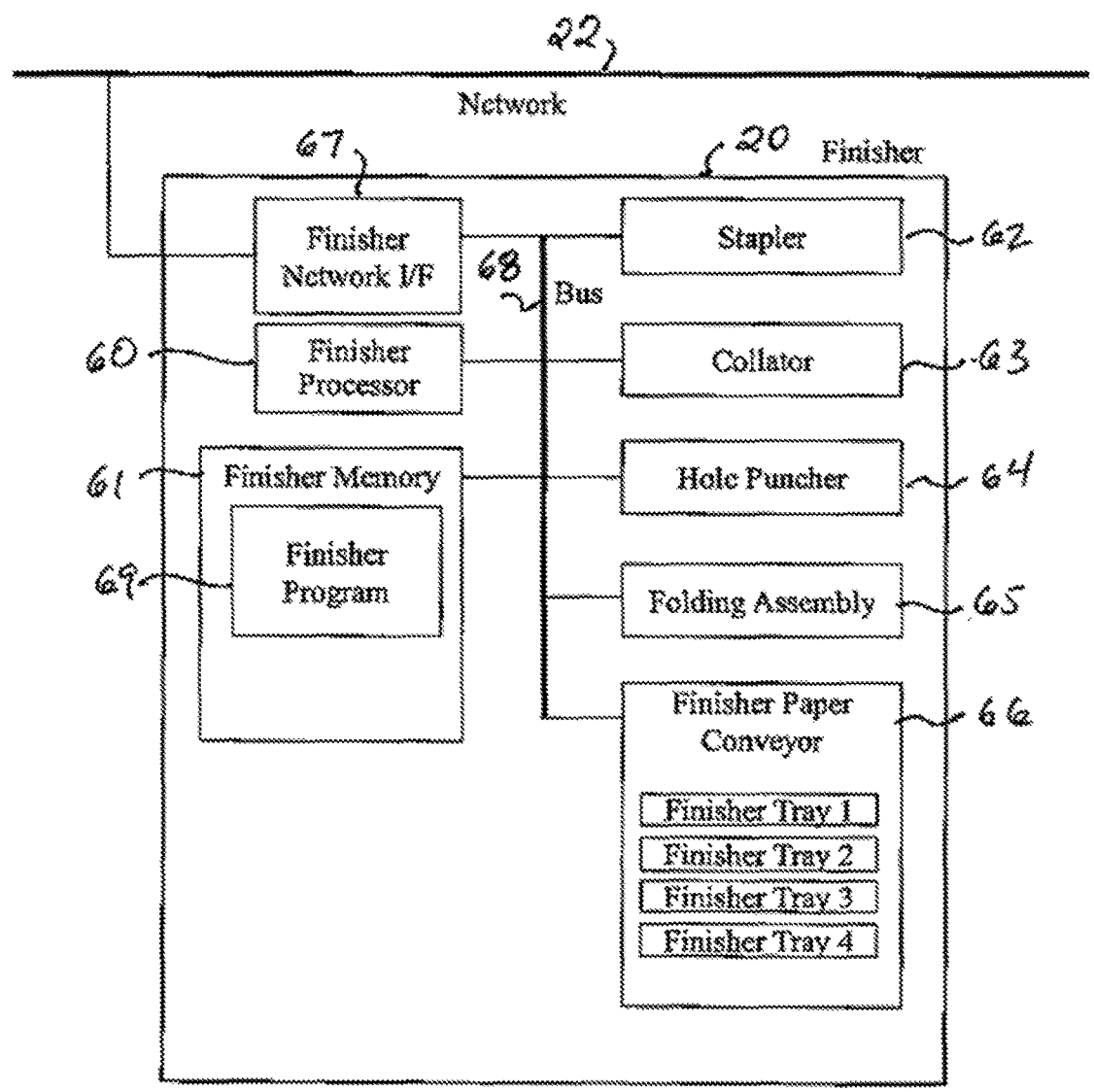
FIG. 6 is a schematic block diagram showing an example finisher of FIG. 2.

As shown in FIG. 6, finisher 20 includes one or more computer processors 60, one or more memory devices 61, stapler 62, collator 63, hole puncher 64, folding assembly 65, finisher paper conveyor 66, and finisher network interface 67. These machine elements of finisher 20 are interconnected via data communication bus 68. The one or more computer processors 60 are collectively referred to as finisher processor 60. Finisher processor 60 includes circuits and electronic components that execute instructions within finisher program 69 for controlling the above-mentioned machine elements of finisher 20.

The one or more computer memory devices 61 are collectively referred to as finisher memory 61. Finisher memory 61 includes any one or a combination of random-access memory (RAM) modules, read-only memory (ROM) modules, and other electronic data storage devices. Finisher memory 61 may include a mass storage type of device such as an optical CD or DVD drive, magnetic hard disk drive, or solid-state flash drive. Finisher memory 61 includes a non-transitory computer readable medium that stores files associated with finisher program 69. The non-transitory computer readable medium of finisher memory 61 may also store data for job data 17 received by finisher 20 from server 14. Job data 17 includes a job ticket, which will be described below.

Stapler 62 is configured to staple sheets of paper together. For example, stapler 62 includes a pusher that pushes a cartridge of metal staples toward a driver which, when actuated, pushes one staple into two or more printed sheets. The driver is actuated by a stapler motor that is electrically controlled based on a signal generated by finisher processor 60. Alternatively, stapler 62 may have other mechanisms known in the art for driving a staple into paper.

Collator 63 is configured to insert one or more sheets of paper between two sheets of paper. For example, collator 63 includes an arm or roller that pushes a sheet of paper between two other sheets of paper. The arm or roller is actuated by a collator motor that is electrically controlled based on a signal generated by finisher processor 60. Alternatively, collator 63 may have other mechanisms known in the art for inserting sheets of paper between two other sheets of paper.

Hole puncher 64 is configured to make a hole in sheets of paper. For example, hole puncher 64 includes a circular blade which, when pressed against paper, cuts a hole in the paper. The circular blade is actuated by a puncher motor that is electrically controlled based on a signal generated by finisher processor 60. Alternatively, hole puncher 64 may have other mechanisms known in the art for cutting a hole in the paper.

Folding assembly 65 is configured to fold paper. For example, folding assembly 65 includes a paper guide, two rollers, and a fold blade. The fold blade is centered between the two rollers at a location below the rollers. The paper guide conveys a sheet of paper next to the fold blade, and then the fold blade pushes a central part of the paper into a nip area between the two rollers. The rollers rotate to pull the central part of the paper into the nip area. The nip area applies pressure to produce a fold at the central part of the paper. The rollers and fold blade are actuated by various motors that are electrically controlled based on signals generated by finisher processor 60. Alternatively, folding assembly 65 may have other mechanisms known in the art for folding paper.

Finisher paper conveyor 66 includes rollers, belts, and mechanical guides that obtain sheets of paper from the appropriate finisher trays and conveys the sheets to any of stapler 62, collator 63, hole puncher 64, and folding assembly 65. The rollers, belts, and mechanical guides are actuated by various motors that are electrically controlled based on signals generated by finisher processor 60. The finisher trays contain stacks of printed sheets of paper from one or more printers 18. The stacks of printed sheets of paper may be transferred manually by a user from printers 18 to the finisher trays. Each stack may have a top sheet having a machine readable code, such as a bar code, that associates the stack with a particular print job. Each finisher tray may include an optical scanner, such as a bar code reader, that reads the machine readable code. Based on information from the optical scanner, finisher processor 60 determines the appropriate finisher tray from which to obtain a sheet of paper and determines an appropriate destination according to job data 17 received by finisher 20. The appropriate destination can be any of stapler 62, collator 63, hole puncher 64, and folding assembly 65. For example, finisher paper conveyor 66 may transport sheets of paper from collator 63 and then to stapler 62.

Some finishers 20 may have additional capabilities, such as stitching, while other finishers 20 may have fewer capabilities. For example, one finisher 20A may be limited to collating, while another finisher 20B may be limited to stapling. Thus, a stack of collated sheets of paper from finisher 20A may be transferred manually by a user to finisher 20B.

Finisher network interface (I/F) 67 is configured to allow finisher 20 to communicate with server 14 through network 22. Finisher network I/F 67 includes circuits and electronic components configured for data communication through network 22. Finisher network I/F 67 enables finisher 20 to receive job data 17 from server 14. Each job to a finisher includes a job ticket that defines print process requirements relevant to that particular finisher. Unlike printer 18, finisher 20 does not have print assembly 53.

Figure 7:
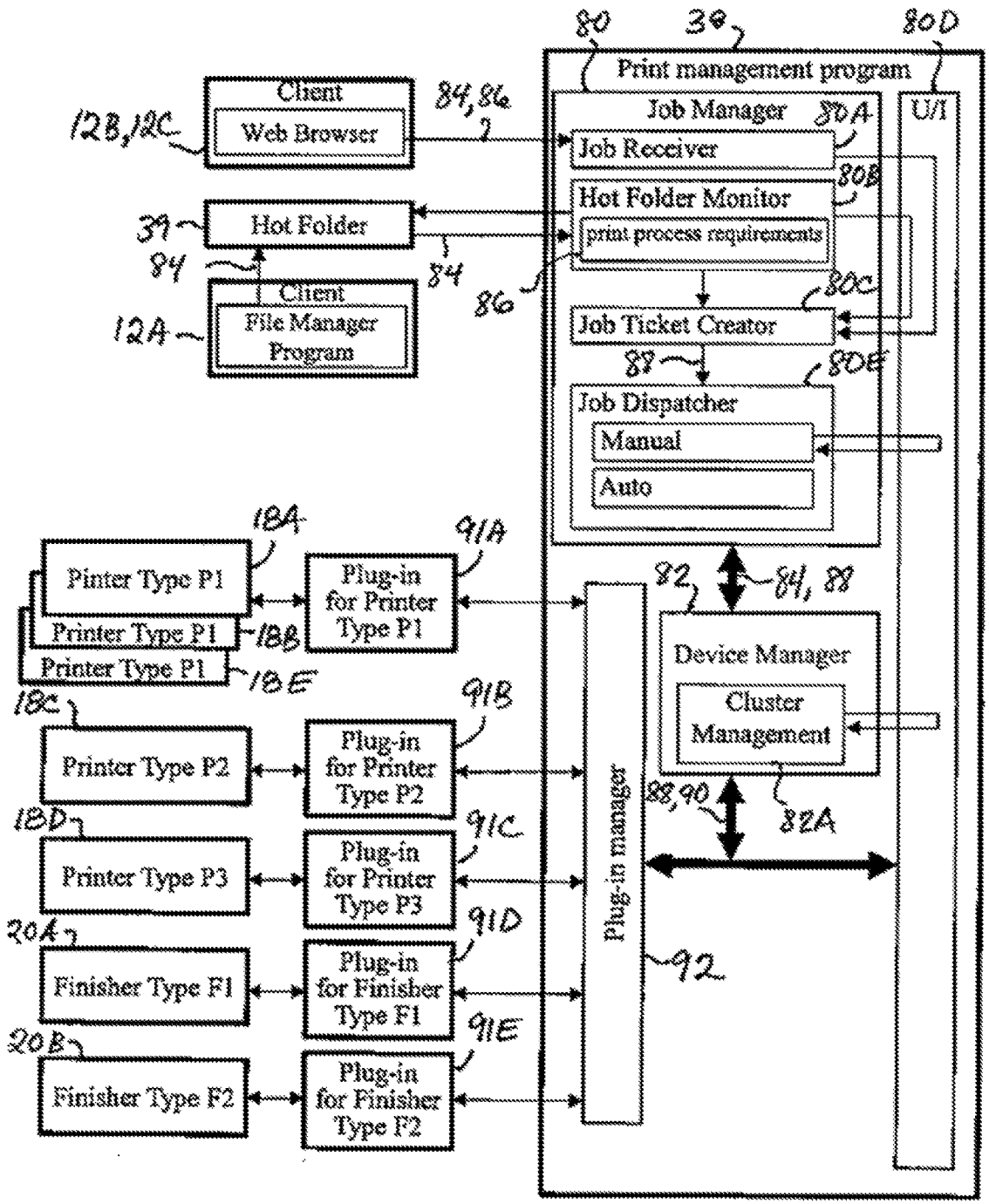
FIG. 7 is a schematic block diagram showing example functional modules of a print management program and example plug-ins mounted in the print server of FIG. 2.

As shown in FIG. 7, print management program 39 includes job manager software module 80 and print production device manager software module 82. The term "print production device" refers to printers 18 and finishers 20.

Job manager software module (abbreviated as job manager) 80 processes print jobs 16 from client devices 12. Functional submodules 80A-80E of job manager 80 are described below.

Print jobs 16 (FIG. 2) from client devices 12A and 12B include printing source file 84 and a corresponding data set of print process requirements 86. Such print jobs are processed by job receiver submodule 80A. Print jobs 16 from client device 12C includes printing source file 84 placed in one of hot folders 39 (FIG. 3) managed by server 14. As previously mentioned, each hot folder 39 has associated with it a data set of print process requirements 86. Hot folder monitor submodule 80B monitors hot folders 39 for any newly deposited printing source file 84. Hot folder monitor submodule 80B associates any newly deposited printing source file 84 with a corresponding data set of print process requirements 86 previously stored in server memory 31.

As previously mentioned, the data set of print process requirements 86 is not in a format that can be understood and used by printers 18 and finishers 20. Job ticket creator submodule 80C creates job ticket 88 based on the data set of print process requirements 86 for print job 16. Job ticket 88 is in a format, such as JDF or other XML-based format, that can be understood and used by the selected print production device. JDF refers to Job Definition Format, which is an industry standard for exchanging information in the graphics industry. Job ticket 88 may be created with some user input via user interface (UI) submodule 80D. User interface submodule 80D receives input from the user through server input device 34 and displays information to the user on server display 35.

Job dispatcher submodule 80E dispatches or assigns print job 16 to one or more print production devices 18, 20. Job dispatcher submodule 80E analyzes job ticket 88 to determine whether print job 16 is to be split among plural print production devices 18, 20. If job ticket 88 includes a parameter value that allows distributed printing, job dispatcher submodule 80E will assign print job 16 to multiple printers 18, or to at least one printer 18 and at least one finisher 20. If job ticket 88 includes a parameter value that prohibits cluster printing (i.e., distributed printing using multiple printers), job dispatcher submodule 80E will assign print job 16 to a single printer and no other printer.

Assignment of print job 16 may include some user input via UI 80D and server input device 34 to assign print production devices having capabilities that match the print process requirements defined in job ticket 88. Alternatively or additionally, assignment of print job 16 may include server 14 analyzing job ticket 88 to autonomously assign print production devices having capabilities that match the print process requirements defined in job ticket 88. A match occurs when a print production device is capable of each of the individual print process requirements.

Print production device manager software module (abbreviated device manager) 82 handles communications with print production devices 18, 20. Device manager 82 includes cluster management submodule 82A that creates job data 17 corresponding to print jobs 16. Job data 17 for printer 18 includes printing language file 90 that is in a language recognized and usable by the printer to allow printing of images defined in printing source file 84 of print job 16. Example printing languages include PostScript (R), Printer Control Language, Portable Document Format (PDF), and XML Paper Specification (XPS). For example, printing source file 84 may be in bitmap format (.BMP file), and printer 18 recognizes PostScript but not bitmap. Cluster management submodule 82A creates job data 17 including printing language file 90 in PostScript.

If job dispatcher 80E has assigned print job 16 to multiple print production devices 18, 20, cluster management submodule 82A splits print job 16 into multiple jobs, referred to as child jobs 17. Each child job can have its own printing language file 90.

For example, print job 16 may be split into first, second, and third child jobs. First child job 17 may be a job for printing color pages defined in first printing language file 90, and the first printing language file 90 is sent by cluster management submodule 82A to a color printer. Second child job 17 may be a job for printing BW pages defined in second printing language file 90, and second printing language file 90 is sent by cluster management submodule 82A to a black-and-white only (BW) printer. Third child job 17 may be a finishing job for collating printed color pages obtained from the color printer into BW pages obtained from the BW printer, and the third child job is sent by cluster management submodule 82A to a collating finisher. Collating is performed according to job ticket 88.

Referring again to FIG. 7, various software plug-ins 91 are installed in server 14. Plug-ins 91 are mounted on print management program 38 to handle communications between server 14 and print production devices 18, 20.

For example, there can be three types of printers 18 according to Table I, and two types of finishers according to Table II.

TABLE I

| Printer Types | Capability |
| --- | --- |
| Type P1 | 2-sided*; BW-only |
| Type P2 | 2-sided*; color** |
| Type P3 | 1-sided only; BW-only |

*Printers capable of 2-sided printing are capable of 1-sided printing.
**Printers capable of color printing are capable of BW printing.

TABLE II

| Finisher Types | Capability |
| --- | --- |
| Type F1 | collating only |
| Type F2 | binding: stapling and stitching |

Plug-in 91A works only with type P1 printers, which are printers 18A, 18B, and 18E. For example, printers 18A and 18B may have 2-sided, BW-only printing capability on letter size sheets only, while printer 18E may have 2-sided, BW-only printing capability on letter and tabloid size sheets. Plug-in 91B works only with type P2 printers, which corresponds only to printer 18C having 2-sided, color printing capability on letter and tabloid size sheets. Plug-in 91C works only with type P3 printers, which corresponds only to printer 18D having single-sided, BW-only printing on letter and tabloid size sheets. The printer capabilities in this example are summarized in Table III. Job dispatcher 80E may use a lookup table similar to Table III stored in server memory 31 to select one or more printers 18 to complete print job 16.

TABLE III

| Printer | Type | Capability |
| --- | --- | --- |
| 18A | P1 | 2-sided, BW-only, letter size only |
| 18B | P1 | 2-sided*, BW-only, letter size only, booklet printing |
| 18C | P2 | 2-sided*, color**, letter and tabloid sizes, stapling |
| 18D | P3 | 1-sided only, BW-only, letter and tabloid sizes |
| 18E | P1 | 2-sided*, BW-only, letter and tabloid sizes |

*Printers capable of 2-sided printing are capable of 1-sided printing.
**Printers capable of color printing are capable of BW printing.

Plug-in 91D works with all type F1 finishers, which corresponds only to finisher 20A in this example. Plug-in 91E works with all type F2 finishers, which corresponds only to finisher 20B in this example. The finisher capabilities in this example are summarized in Table IV. Job dispatcher 80E may use a lookup table similar to Table IV stored in server memory 31 to select one or more finishers 20 to complete print job 16.

TABLE IV

| Finisher | Type | Capability |
| --- | --- | --- |
| 20A | F1 | collating only, letter and tabloid size |
| 20B | F2 | stapling, stitching, letter and tabloid size |

Plug-in manager 92 is a software module of print management program 38. Plug-in manager 92 analyzes all plug-ins 91 to determine what type of plug-ins have been mounted. In FIG. 7, plug-in manager 92 determines that plug-ins for printer types P1, P2, and P3 are available, and that plug-ins for finisher types F1 and F2 are available. If FIG. 7 is modified by removing plug-in 91A, plug-in manager 92 will determine that no plug-in for printer type P1 is available. Plug-in manager 92 may maintain a listing of the plug-ins that are available, and the listing is accessed by plug-in manager 92 whenever a print job is received by server 14

The plug-ins are not essential parts of print management program 38, which includes job manager module 80, device manager module 82, and plug-in manager module 92. Each of modules 80, 82, and 92 can continue to function as previously described after removal of any one of plug-ins 91. For example, removal of plug-in 91E may be appropriate if all Type F2 finishers are permanently taken away from the print shop.

Figure 8:
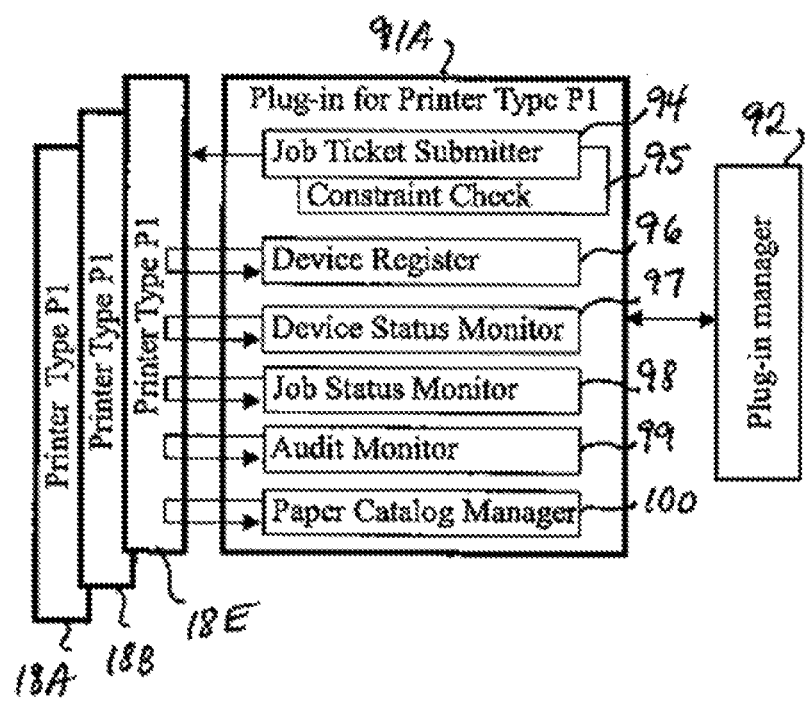
FIG. 8 is a schematic block diagram showing example functional modules of the plug-ins of FIG. 7.

Referring to FIG. 8, functional submodules 94-100 of plug-in 91A will be described below. All other plug-ins 91B-E have the same functional submodules 94-100.

Job ticket submitter submodule 94 sends job ticket 88 to the selected print production device. For example, printer 18E has 2-sided only, BW-only printing capability on letter and tabloid size sheets as shown in Table III. If job ticket 88 from job ticket creator 80C (FIG. 7) specifies 1-sided, BW printing on tabloid size sheets, job dispatcher 80E may select printer 18E, and then job ticket submitter submodule 94 of plug-in 91A sends job ticket 88 to printer 18E. Plug-in 91A would also send printing language file 90 to printer 18E. Printing language file 90 defines the content to be printed, and job ticket 88 defines the requirements (2-sided, BW printing on tabloid size sheets) for printing the content. For example, the content could be a photograph, illustration, text, or a combination thereof.

Constraint check submodule 95 enables the selected print production device to confirm that it supports all print process requirements in job ticket 88. Continuing from the previous example, printer 18E is capable of printing on tabloid size paper, but tabloid size paper may be currently unavailable in printer 18E, so the constraint is communicated to job dispatcher submodule 80E.

Job dispatcher submodule 80E (FIG. 7) performs a printer constraint resolution process. For example, job dispatcher submodule 80E may try to find another printer capable of 1-sided, BW printing on tabloid size paper. As shown in Table III, printer 18C is capable of 2-sided color printing on tabloid size paper, which means that it is also capable of printing on a single side (1-sided printing) using black only (BW printing). To resolve the constraint, job dispatcher submodule 80E may autonomously change the selection from printer 18E to printer 18C, or it may allow the server-side user to confirm the change via graphic user interfaces (e.g. FIGS. 11-15).

In a further example, job ticket 88 may require finishing that includes both stapling and stitching, so finisher 20B is selected by cluster management submodule 82A based on Table IV, which shows that finisher 20B can staple and stitch on tabloid size paper. However, finisher 20B is incapable for performing both stapling and stitching on the sheets of paper, so the constraint is communicated to dispatcher submodule 80E.

Job dispatcher submodule 80E performs a finisher constraint resolution process. For example, job dispatcher 80E may allow the server-side user to waive or remove one of the binding requirements via UI 80D. If the user removes the stapling requirement, the constraint is resolved, and the job will proceed with finisher 20B performing stitching only.

Referring again to FIG. 8, device register submodule 96 obtains identifying information from all print production devices 18, 20 connected to server 14. Identifying information, such as a machine name and/or machine location are displayed by UI 80D on server display 35 (FIG. 3). Device status submodule 97 polls all print production devices 18, 20 to obtain device status information from each print production device. Examples of device status information include offline, busy, idle, and paper jam. Device status information is communicated to job dispatcher submodule 80E, which uses the job status information to determine which print production devices 18, 20 will be assigned to print jobs 16.

Job status monitor submodule 98 receives job status indicator about the job that was sent to print production devices 18, 20. Example job status indictors include waiting, in progress, completed, and error. Each print production device sends a job status indicator that may be displayed by UI 80D on server display 35 (FIG. 3).

Audit monitor submodule 99 receives and analyzes audit information from print production devices 18, 20, converts the audit information to readable data that is recognizable by print management program 38, and transmits the readable data to print management program 38. The audit information from printer 18 includes information on a number of pages printed relative to a printer tray and paper sheet size. For example, the audit information may specify that letter size paper from printer tray 1 was used for 205 pages. The audit information from finisher 20 includes information on a number of pages subjected to a finishing operation.

Paper catalog manager submodule 100 receives a paper catalog from each printer 18 and transmits the paper catalog to print management program 38. Each printer 18 has a function for storing paper-related settings associated with a printer tray. Paper-related settings are a group of paper parameters, such as paper size, color, weight, and material type. Each paper-related setting (group of paper parameters) is given a catalog name in a paper catalog. Since the paper catalog (a group of catalog names) is transmitted by paper catalog manager submodule 100 to print management program 38, a client-side user may assign one or more catalog names to print job 16. Advantageously, the client-side user does not have to specify paper parameters individually for print job 16. Print management program 38 recognizes the catalog names in print job 16 and assigns the appropriate printer or printers to complete printer order 16. The selected printer or printers are those that have printer trays that correspond to the catalog names in print job 16. Paper catalog manager submodule 100 is an interface for communicating with printer 18 to obtain information about paper-related settings associated with printer trays, analyzing said information and then converting it into data (a paper catalog) that is recognizable by print management program 18.

Referring again to FIG. 7, each plug-in 91B-E handles communications between server 14 and only one of the print production devices to complete a single print job 16. Each plug-in 91B-E does not handle communications with more than one print production device for a single print job 16. For example, plug-in 91A handles communications between server 14 and either printer 18A, 18B, or 18E to complete a single print job 16.

Figure 9:
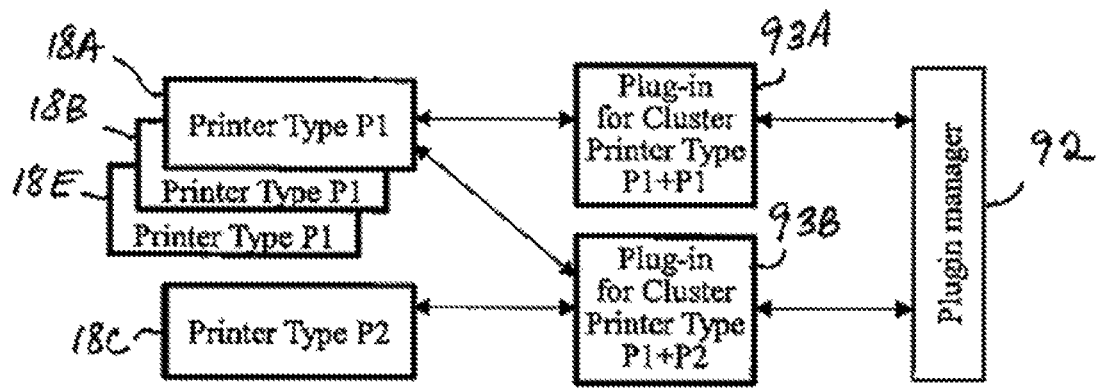
FIG. 9 is a schematic block diagram showing example group plug-ins mounted in the print server of FIG. 2, the group plug-ins being for a distributed print job using two or more printers.
Figure 10:
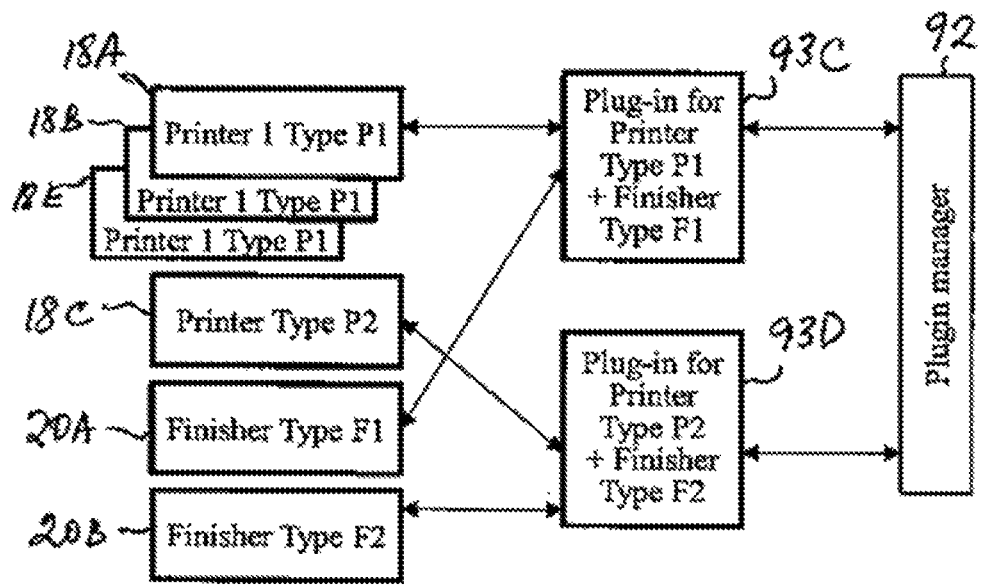
FIG. 10 is a schematic block diagram showing example group plug-ins mounted in the print server of FIG. 2, the group plug-ins for a distributed print job using a printer and a finisher.

FIG. 7 may be modified to include one or more group plug-ins. A group plug-in handles communications between server 14 and two or more print production devices to complete a single print job 16. For example, a group plug-in may handle communication with two printers as shown in FIG. 9. As a further example, a group plug-in may handle communication with one printer and one finisher as shown in FIG. 10.

FIG. 9 shows group plug-ins 93A and 93B that can be added to FIG. 7. Each of group plug-ins 93A-B has functional submodules that function in the same way as those for plug-ins 91A-E. In addition, each of group plug-ins 93A-B has a cluster management submodule that splits print job 16 into multiple jobs, referred to as child jobs 17, if job dispatcher 80E in print management program 38 has assigned print job 16 to multiple printers 18.

Group plug-ins 93A and 93B handle communication between server 14 and two printers to complete a single print job 16. Plug-in 93A handles communications to two type P1 printers to complete a single print job 16. For example, a single print job 16 may require 2-sided printing of thousands of BW letter size pages. Based on Table III, job dispatcher 80E may divide the pages between printers 18A and 18B. Some pages of print job 16 may be assigned to printer 18A, and the remaining pages of print job 16 may be assigned to printer 18B. Alternatively, if printer 18B is busy, job dispatcher 80E may assign to printer 18E instead.

Plug-in 93B handles communications between server 14 and two types of printers: type P1 and type P2. For example, a single print job may have BW pages and color pages. Based on Table III, job dispatcher 80E may assign the BW pages to printer 18A (type P1) and assign the color pages to printer 18C (type P2).

FIG. 10 shows group plug-ins 93C and 93D that can be added to FIG. 7 or FIG. 7 in combination with FIG. 9. Each of group plug-ins 93C-D has functional submodules that function in the same way as those for plug-ins 91A-E. Group plug-ins 93C and 93D handle communication between server 14 and a printer and a finisher. Plug-in 93C handles communications between server 14, a type P1 printer, and type F1 finisher. For example, a single print job 16 may require 2-sided BW letter size pages that are to be collated with colored paper. Based on Tables III and IV, job dispatcher 80E may divide the print job between printer 18A and finisher 20A.

Plug-in 93D handles communications between server 14, a type P2 printer, and type F2 finisher. For example, a single print job 16 may require 2-sided color tabloid size pages that are to be stapled. Based on Tables III and IV, job dispatcher 80E may divide the print job between printer 18C and finisher 20B.

The status of the print production devices (printers and finishers) and print jobs are displayed to allow a server-side user, such as a print shop administrator, to know what is currently happening at many devices and to know what jobs are pending in line. This can allow the user to maintain workflow efficiency by responding to negative status indicators (such as a paper jam or other malfunction) and to provide input to the print management program to select the best devices to carry out print jobs. The status information is displayed graphically and arranged in such a way to help the user assimilate a large amount of information with a brief glance at a display screen.

Figure 11:
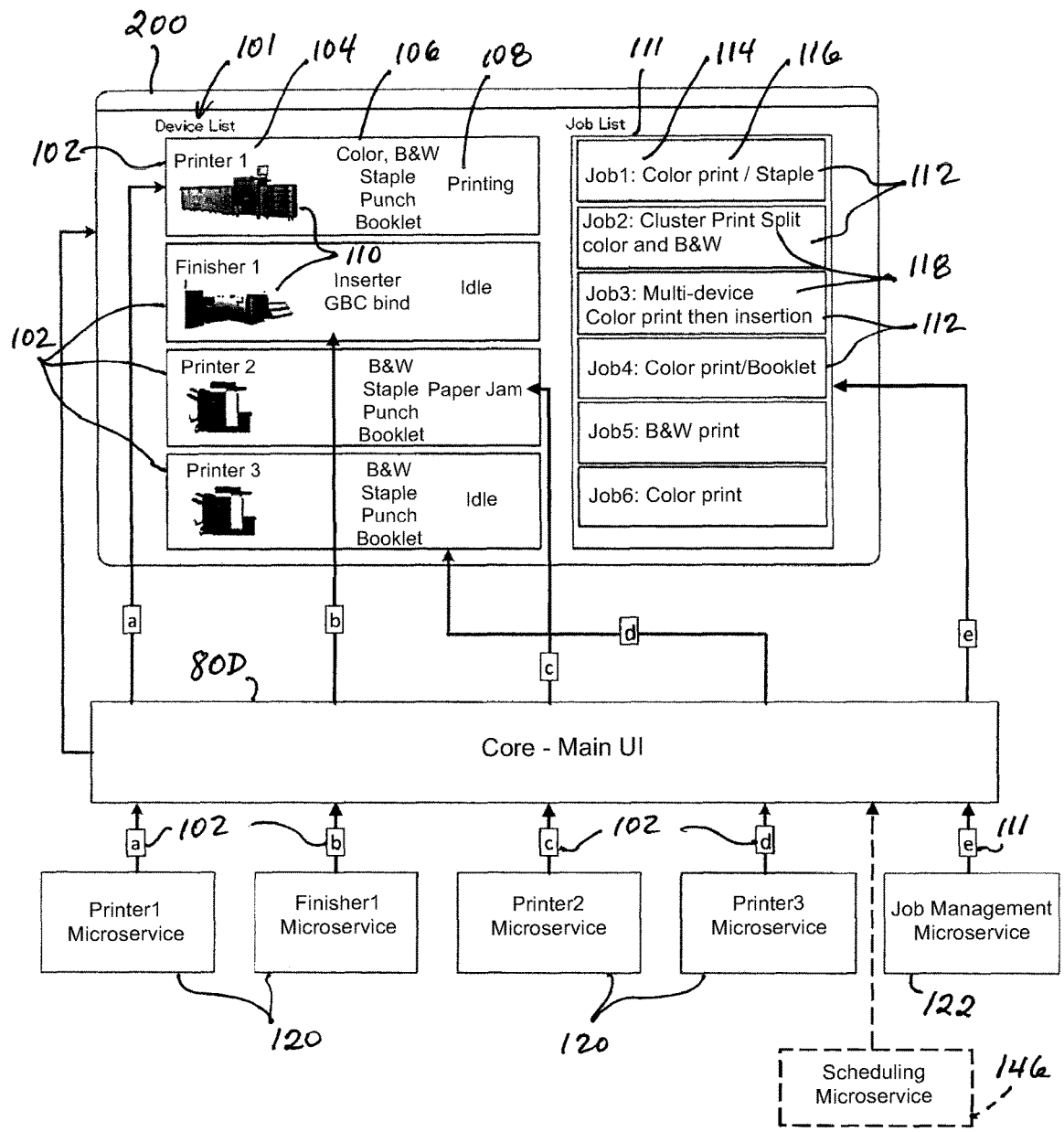
FIG. 11 is diagram showing example microservices that create elemental panes of a graphic user interface for visualizing print management at a print shop site.

FIG. 11 shows example main UI 200 displayed on server display 35 (FIG. 3). Main UI 200 is a graphic user interface organized into a device list and a job list.

Device list 101 shows a list of print production devices. Each print production device is represented by UI device pane 102. Each UI device pane 102 includes information about the corresponding print production device. The information includes device name 104 (e.g., Printer 1) which has been previously assigned, device capabilities 106, and print status 108. Optionally, each UI device pane 102 includes image 110 of the device, such as a photograph or illustration.

Job list 111 comprises job panes 112 which represent print jobs. Each print job is represented by its own UI job pane 112. Each UI job pane 112 includes information about the corresponding print job, such as job name 114 and print process requirements 116 that define print requirements and any finishing requirements. Optionally, a UI job pane may include label 118 that tells the user that the print job has been determined by the server 14 to be a distributed print job. That is, the print job will be completed using two or more print production devices, in which case one of the group plug-ins may be used as previously described. Label 118 can be in the form of text (e.g., "Multi-device" or "Cluster Print") or symbol that is understood by the user to represent a distributed print job.

The code for print management program 38 can be enormously and complex, as can be appreciated from the above descriptions of various functional software modules and submodules and when considering the abundant diversity of print production machines that server 14 may be required to handle. Conventionally, the various software elements of print management program 38, including any that might be desired for depicting graphical representations of print production devices and print jobs, would be integrated in a monolithic software architecture. With a monolithic software architecture, it would usually take many months for the print management program to be modified and validated so that a UI device pane can be displayed for a newly developed printer model. For example, the new printer may require server 14 to use a unique communication protocol for obtaining device status. Also, a monolithic software architecture can make it difficult to rapidly implement a minor update to the UI design based on user feedback or a change in user requirements, for example. Also, a major change may be needed to customize the UI design for another customer at a different print shop site.

To overcome the above difficulties in UI design flexibility associated with a monolithic software architecture, a microservices-based architecture is implemented for software elements that depict graphical representations of print production devices at the print shop site and print jobs received by server 14. Referring again to FIG. 11, separate microservices 120 are deployed to independently provide UI device panes 102. Each of these microservices are referred to as device microservice 120 since they are specific to a corresponding one of the print production devices 18, 20 (FIG. 2) at the print shop site. In this way, a first device microservice may use a particular communication protocol suitable for a print production device of one manufacturer, and a second device microservice may use another communication protocol suitable for a print production device of another manufacturer. Device microservices 120 are elements of device manager 82 (FIG. 7) of print management program 38. The microservices can be developed independently of each other, even with different programming languages. This enhances scalability of the print management program as the print shop grows over time.

In addition, job management microservice 122 provides UI job panes 112. Job management microservice 122 is an element of job manager software module (abbreviated as job manager) 80 of FIG. 7. In certain embodiments, each microservice 120, 122 is independent of the others in that any microservice may be disabled without having an effect on the functions of the other microservice. For example, it may be appropriate to disable or remove a device microservice from print management program 38 after its corresponding print production device is permanently taken away from the print shop site.

As previously discussed, print management program 38 includes user interface submodule 80D (FIG. 7). As shown in FIG. 11, user interface submodule 80D (also referred to as main UI application) receives UI device panes 102 from the plurality of device microservices 120. Again, each device microservice 120 corresponds to a different one of a plurality of print production devices. Each UI device pane 102 comprises print status information 108 for a corresponding print production device. Main UI application 80D receives UI job list 111 from job management microservice 122. Main UI application 80D causes UI device panes 102 and UI job list 111 to be displayed as parts of main UI 200 on server display 35 (FIG. 3). Also, main UI application 80D applies information, such as graphic indicators described below, to the panes received from microservices 120, 122.

Figure 12:
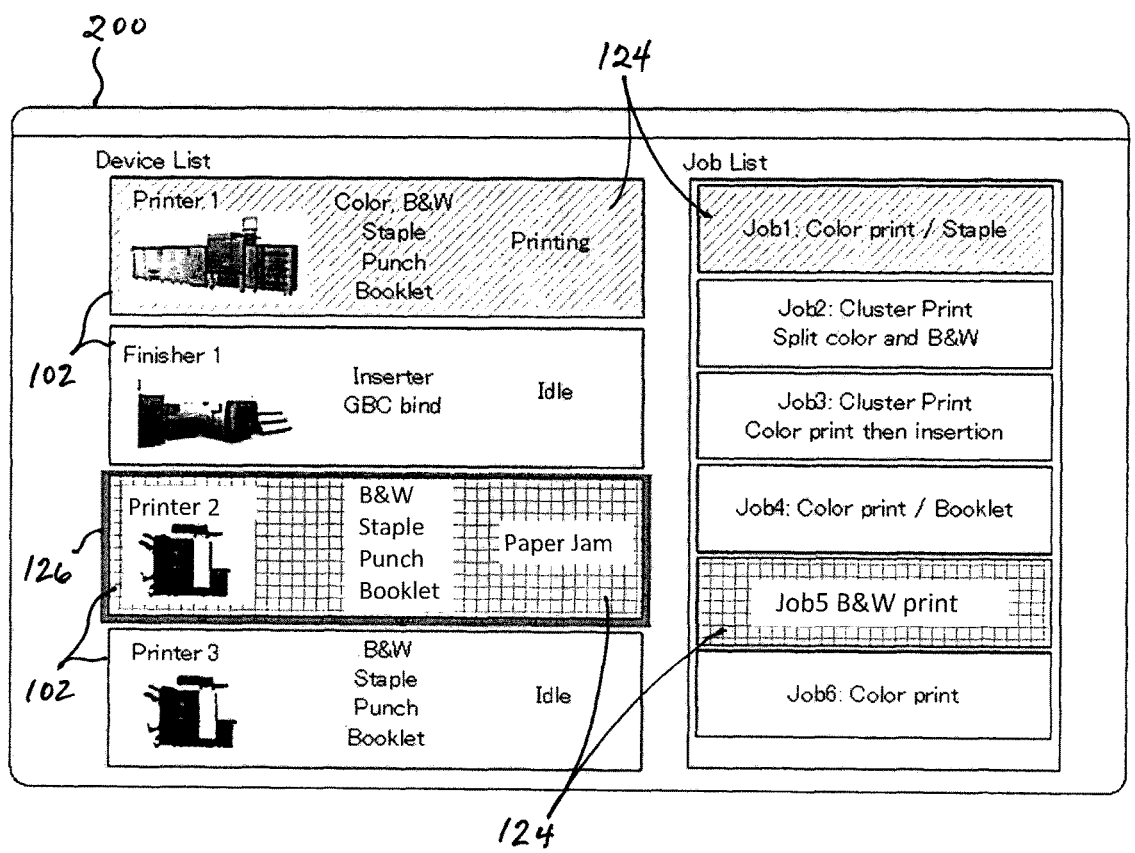
FIGS. 12-15 are diagrams showing additional information added to the elemental panes created by microservices.

As previously discussed, print management program 38 may determine that a print job is assigned to one or more print production devices 18, 20. Main UI 200 may further comprise a graphic indicator, referred to herein as an assignment indicator, showing that a print job is assigned to one or more print production devices. In the example of FIG. 12, main UI application 80D adds assignment indicator 124 in the form of cross-hatch lines to UI device panes 102. Diagonal cross-hatch lines are used to show that Job 1 is assigned to Printer 1, and box-type cross-hatch lines are used to show that Job 5 is assigned to Printer 2. The assignment indicator may also show that a print job is assigned to a group of two or more of the print production devices, as will be discussed below.

Main UI 200 may further comprise another type of graphic indicator, referred to herein as a device problem indicator 126, showing that a print production device has a problem. The problem may be something that requires human intervention. Example problems include without limitation, a paper jam, a service call alert, a paper supply outage, and a toner supply outage. In the example of FIG. 12, main UI application 80D adds device problem indicator 126 in the form of a flashing red border surrounding UI device pane 102 of Printer 2. The border calls the user's attention to the paper jam in Printer 2.

Figure 13:
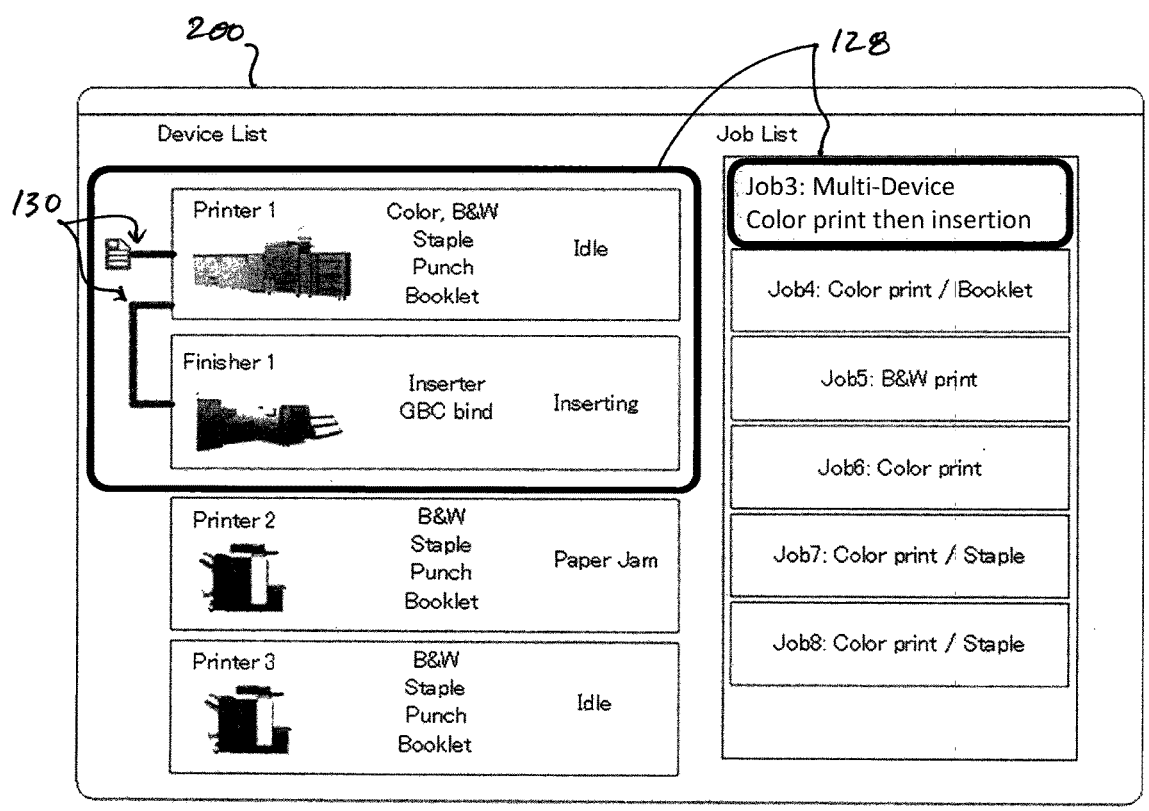

Main UI 200 may further comprise another type of graphic indicator, referred to herein as an option indicator, showing a group of the print production devices as an option for executing the print job. In the example of FIG. 13, main UI application 80D adds option indicator 128 in the form of a thick black box enclosing the UI job pane of Job 3 combined with a thick black box enclosing the UI device panes of Printer 1 and Finisher 1 (an enclosed group). This option indicator shows that the enclosed group is an option for executing Job 3. Job 3 requires color printing and a finishing process that involves insertion (e.g., insertion of divider sheets), and print management program 38 has matched those job requirements to the device capabilities and device status of Printer 1 and Finisher 1. The user may confirm assignment of Job 3 to Printer 1 and Finisher 1 by performing a drag operation via server input device 34 by which the UI job pane of Job 3 is dragged or moved toward the enclosed group.

Figure 14:
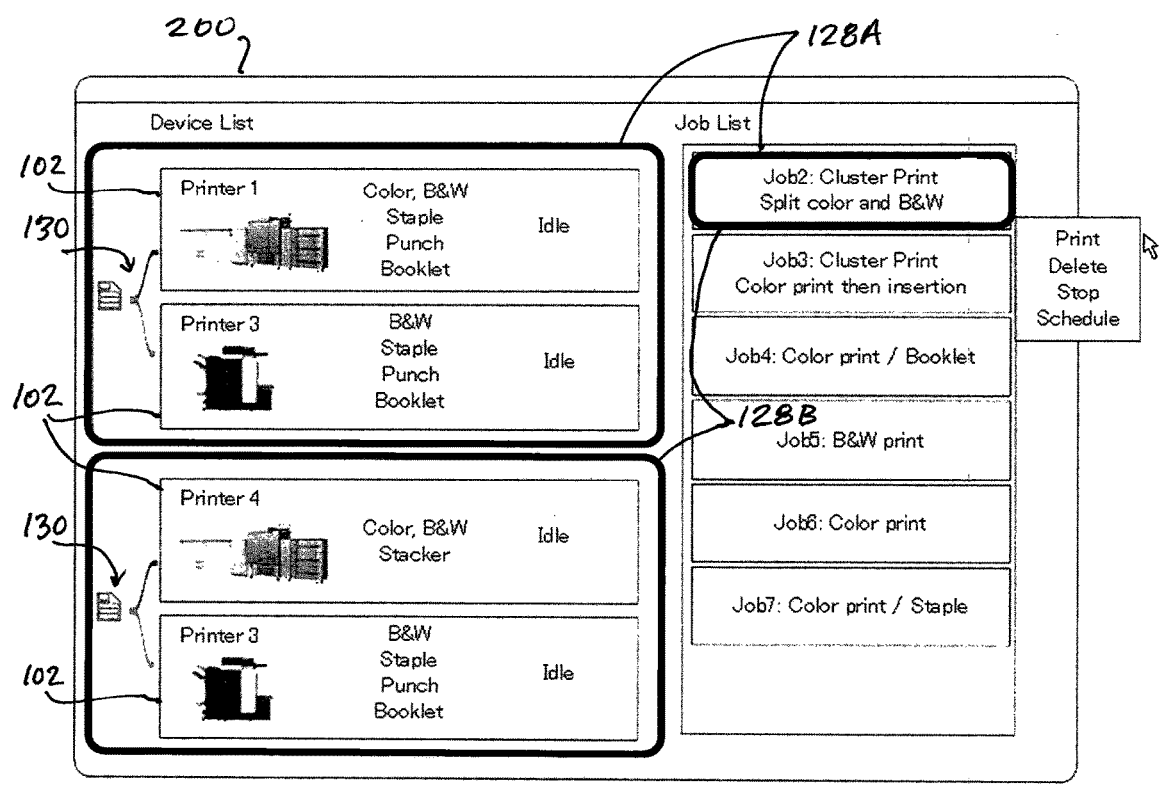
Figure 15:
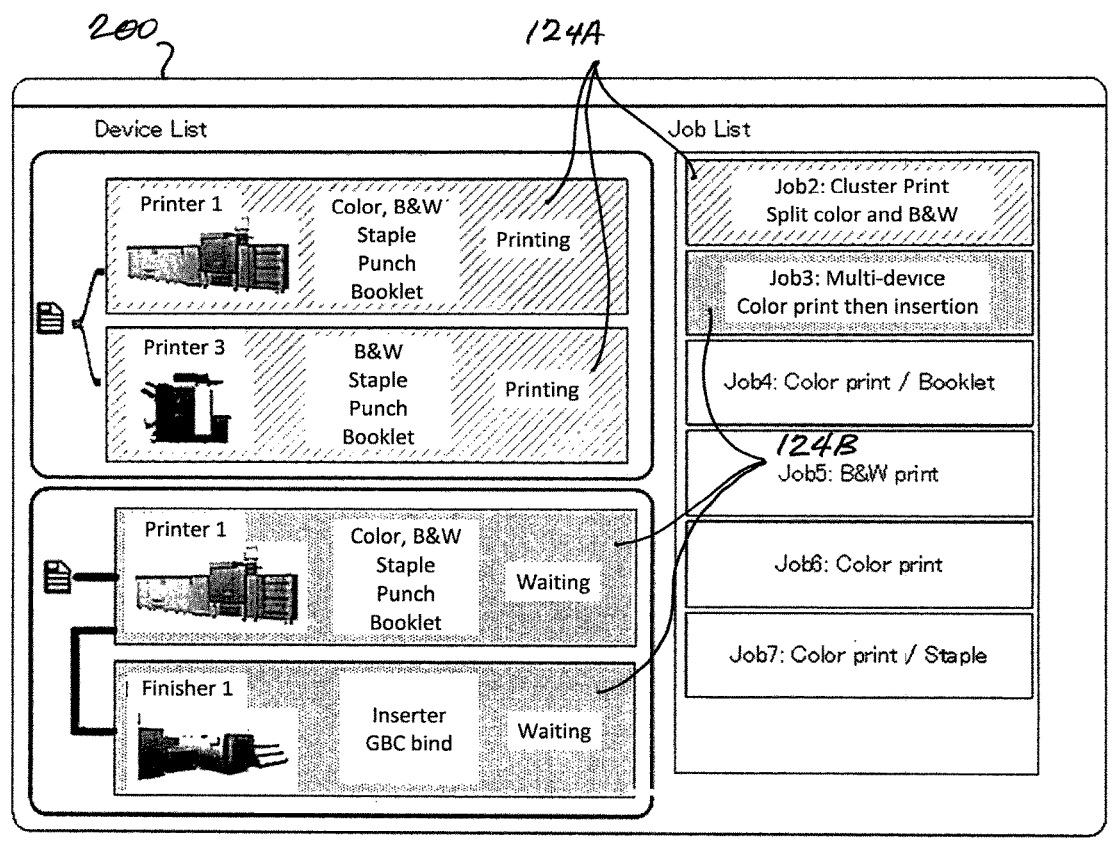

In the example of FIG. 14, first option indicator 128A is in the form of a thick black box enclosing the UI job pane of Job 2 combined with a thick black box enclosing the UI device panes of Printer 1 and Printer 3 (a first enclosed group). Second option indicator 128B is in the form of a thick box enclosing the UI job pane of Job 2 combined with a thick box enclosing the UI device panes of Printer 4 and Printer 3 (a second enclosed group). The first and second option indicators show that the first and second enclosed groups are alternative options for executing Job 2. Job 2 is a distributed print job (as indicated by the "Cluster Print" text) that requires color printing and BW printing. Print management program 38 has matched those job requirements to the device capabilities and status of the first and second enclosed groups. The user can then select one of the enclosed groups and assign Job 2 to the selected group by dragging the UI job pane of Job 2 toward the selected group. In the example of FIG. 15, the user has selected Printer 1 and Printer 3 (the first enclosed group in FIG. 14) and has assigned Job 2 to the first enclosed group. As a result, main UI application 80D adds first assignment indicator 124A in the form of diagonal cross-hatch lines that show Job 2 as being assigned to the first enclosed group. Also, main UI application 80D adds second assignment indicator 124B in the form of gray background that shows Job 3 as being assigned to the second enclosed group.

Main UI 200 may further comprise yet another type of graphic indicator, referred to herein as job sequence indicator, showing a sequence in which a print job is to executed by two or more print production devices. In the example of FIG. 13, main UI application 80D adds job sequence indicator 130 in the form an icon, which represents the print job, with a first line connecting the icon to the UI device pane of Printer 1, and a second line connecting the UI device pane of Printer 1 to that of Finisher 1. This job sequence indicator shows that, if the user assigns Job 3 to Printer 1 and Finisher 1, printing by Printer 1 will be performed first followed by insertion by Finisher 1. In the example of FIG. 14, main UI application 80D adds two job sequence indicators 130. Each one is in the form of an icon, which represents the print job, with two lines connecting the icon to two UI device panes. These job sequence indicators show that, if the user assigns Job 2 to the first enclosed group, color printing by Printer 1 and BW printing by Printer 3 will be performed in parallel or simultaneously. If the user assigns Job 2 to the second enclosed group, color printing by Printer 4 and BW printing by Printer 3 will be performed in parallel.

Referring again to FIG. 1, system 10 may comprise a plurality of print shops at different sites. The print shop at the first site has first print server 14 that manages a first plurality of print production devices 18, 20. The print shop at the second site has second print server 14 that manages a second plurality of print production devices 18, 20. Each of the servers includes its own job manager 80, main UI application 80D, and device manager 82. Each job manager 80 includes its own job management microservice 122. Each device manager 82 (FIG. 7) includes its own set of device microservices 120 (FIG. 11). The device UI panes and job UI panes from both print shop sites may be incorporated into a dashboard graphic user interface for use by a multi-site user, such as a person overseeing operations of both print shop sites.

Figure 16:
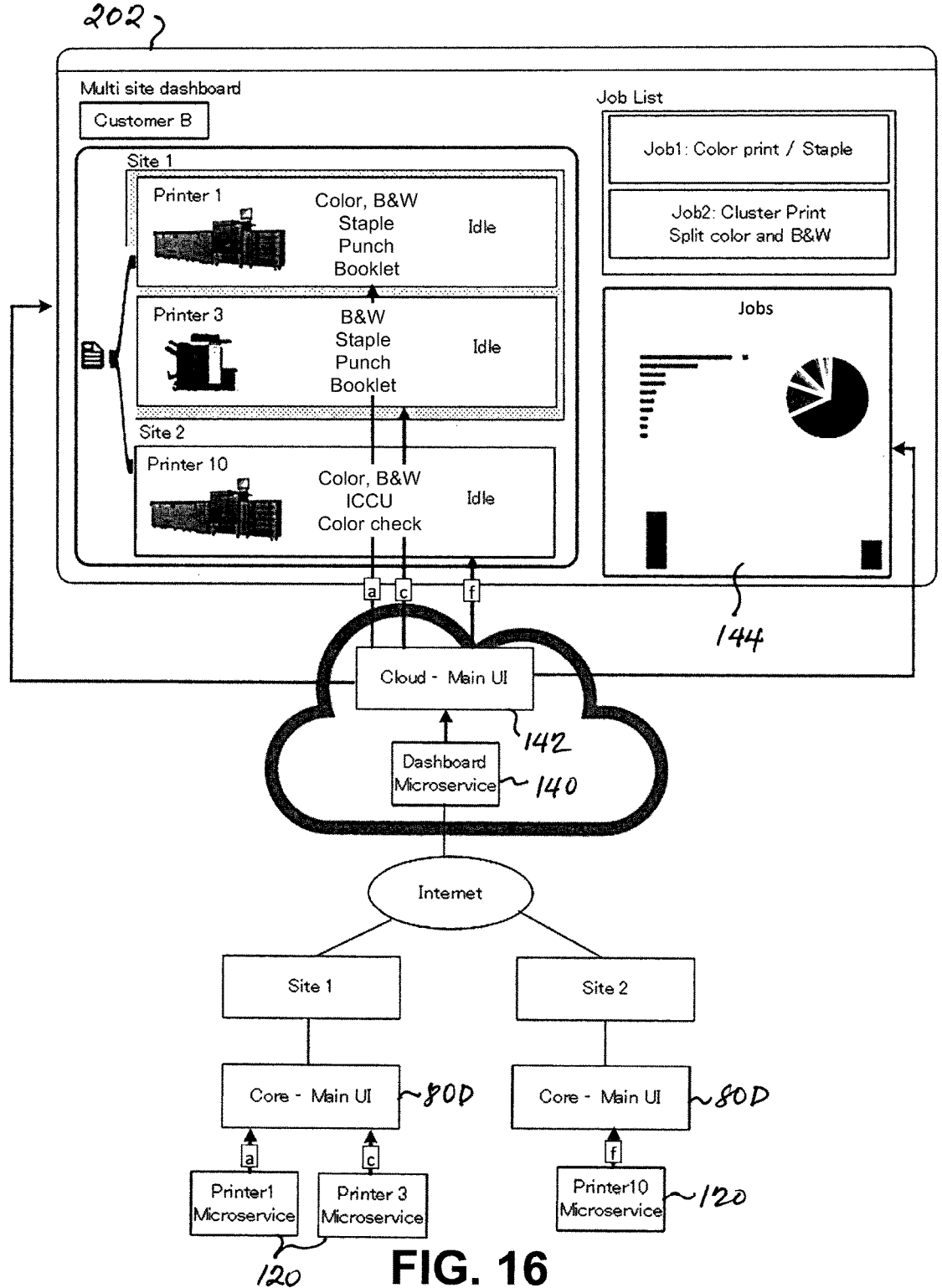
FIG. 16 is a diagram of example cloud-based microservices that use elemental panes created by microservices for a graphic user interface for visualizing print management at multiple print shop sites.

FIG. 16 shows an example dashboard graphic user interface 202 (abbreviated dashboard UI) mentioned above. Dashboard UI 202 can show information about multiple print shop sites. Dashboard UI 202 can be displayed on a display screen of client device 12D (FIG. 1), which is configured according to FIG. 4. Client device 12D accesses cloud-based microservices to enable display of dashboard UI 202. The cloud-based microservices include dashboard microservice 140 and cloud-based UI microservice 142. The cloud-based microservices are independent of the print shop servers 14 and client device 12D, which can allow for rapid deployment of a modification to dashboard UI 202 without involvement of print shop personnel or the multi-site user. Also, there may be many different multi-site users on separate client devices from which they oversee their own groups of print shop sites. The microservice architecture allows for customization of dashboard UI 202 according to the specific requirements of the multi-site users. For example, the dashboard UI for a multi-site user in a publishing company (Multi-site user A) with print shops in different cities may be different from that of a multi-site user in a manufacturing company (Multi-site user B). Multi-site user A would access dashboard microservice 140 and cloud-based UI microservice 142 different from those accessed by Multi-site user B.

Referring again to FIG. 16, dashboard microservice 140 receives the UI device panes and the UI job list from the first print server at the first print shop site and from the second print server at the first print shop site. Dashboard microservice 140 also receives performance information from the first and second print servers. The performance information relates to the print production devices at the first and second print shop sites. The performance information can be one or a combination of job completion time information, job volume information, and print production device usage information. Job completion time information is the amount of time taken by a print production device to complete a print job. Job volume information is the size (e.g., number of pages) of the print job completed by the print production device. Print production device usage information is the amount of time that the print production device is in use. These are non-limiting examples, as other types of performance information can be sent by print servers 14 to dashboard microservice 140.

Dashboard microservice 140 generates performance pane 144 based on the performance information it receives. Performance pane 144 includes a graphical representation of the performance information. For example, the graphical representation may be in the form of a chart and/or graph. If a multi-site user wants a particular type of chart, for example, a modified version of dashboard microservice 140 can be rapidly developed and deployed independently of existing microservices.

Cloud-based UI microservice 142 receives the UI device panes, the UI job list, and performance pane 144 from dashboard microservice 140. Client device 12D (FIG. 1) accesses cloud-based UI microservice 142 via its web browser so that dashboard UI 202 is displayed on the display screen of client device 12D.

Figure 17:
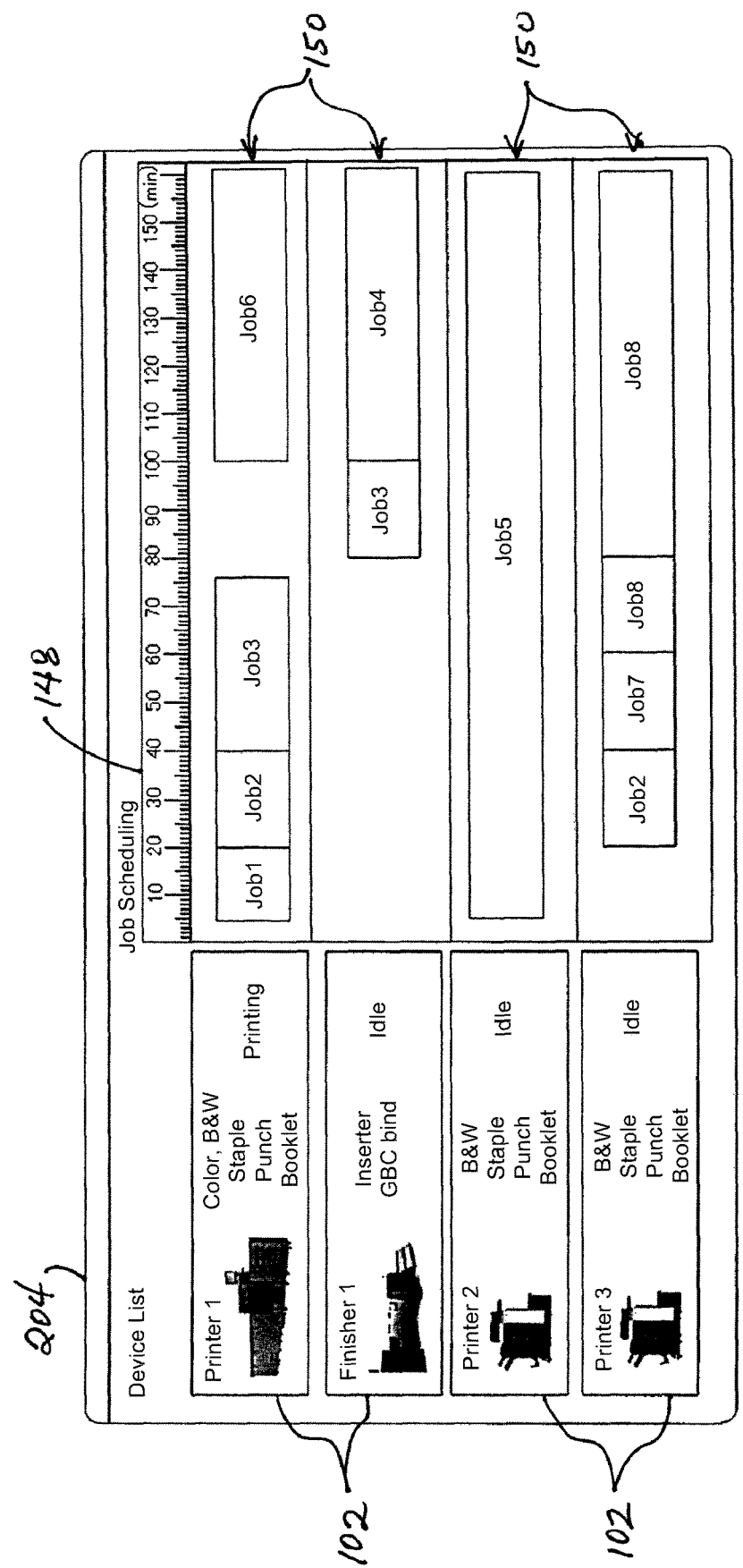
FIG. 17 is a diagram showing elements of an example scheduling graphic user interface for visualizing print management.

FIG. 11 may be modified to include job scheduling microservice 146 that enables display of a scheduling UI that can help a user visualize time periods in which print production devices will be used to execute print jobs. FIG. 17 shows an example scheduling UI 204. With use of server input device 34 (FIG. 3), the user may toggle between main UI 200 (FIG. 11) and scheduling UI 204. For example, the user may use main UI 200 to assign jobs to print production devices. Thereafter, the user may switch from main UI 200 to scheduling UI 204 to see on-duty time periods (times in which print production devices will be used) and idle time periods. This can help the user fill in idle time periods with newly arrived print jobs or rearrange pending print jobs to reduce idle time periods.

In operation, main UI application 80D receives a UI scheduling pane from job scheduling microservice 146 (FIG. 11). FIG. 17 shows an example UI scheduling pane 148. UI scheduling pane 148 comprising a plurality of time lines 150, one for each of the print production devices. Each time line graphically shows a sequence for executing one or more of the print jobs. A print job appears on only one of the timelines when the print job is assigned to only one of the print production devices. A print job appears on two or more of the timelines when the print job is assigned to a group of two or more of the print production devices. Located above timelines 150 are time markers in units of minutes from the present time. For instance, the trailing edge of Job 1 is at the 20 minute mark, which allows the user to immediately see that Job 1 will be completed in 20 minutes. If instead another user wants time markers to show the time of day, for example, a modified version of scheduling microservice 146 can be rapidly developed and deployed independently of existing microservices.

Main UI application 80D causes UI device panes 102 and UI scheduling pane 148 to be displayed as parts of scheduling UI 204 on server display 35 (FIG. 3). Main UI application 80D aligns each UI device pane 102 with a different one of the timelines 150 to show that print jobs on the time line are assigned to the print production device represented by the UI device pane. In FIG. 17 for example, UI device pane 102 of Printer 1 is horizontally aligned with a timeline containing Job 1, Job 2, Job 3, and Job 6. This allows the user to immediately see that these jobs are assigned to Printer 1 and to see the sequential order in which these jobs will be performed. This also allows the user to immediately see an idle time period between Job 3 and Job 6, so the user might be able to assign a new print job to Printer 1 during that idle time if appropriate. UI device pane 102 of Printer 3 is horizontally aligned with a timeline containing Job 2, which is vertically aligned with Job 2 in the timeline for Printer 1. This allows the user to immediately see that portions of Job 2 will be executed in parallel by Printer 1 and Printer 3. Also, UI device pane 102 of Finisher 1 is horizontally aligned with a timeline for Job 3, which is vertically offset from Job 3 in the timeline for Printer 1. This allows the user to immediately see that portions of Job 3 will be executed in series by Printer 1 followed by Finisher 1.

Figure 18:
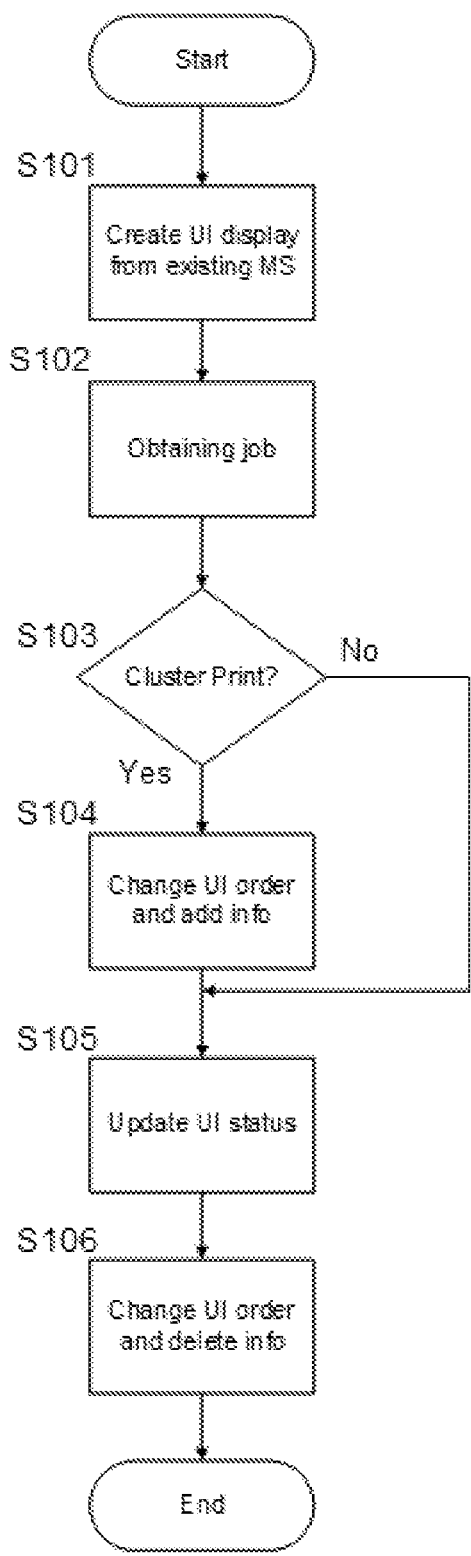
FIGS. 18 and 19 are flow diagrams of example methods for visualizing print management.

FIG. 18 shows an example method for print management visualization. At block S101, server 14 creates UI display from existing microservices. For example, server 14 uses device microservices 120 to create main UI 200 with device list 101 as shown in FIG. 11, with Printer 1 on top followed by Finisher 1. At block S102, a print job is obtained. For example, server 14 may receive Job 2 as shown in FIG. 14. For example, server 16 uses job management microservice 122 to generate job list 111 with a UI job pane for the received print job, and then the job list 111 added to main UI 200. At block S103, server 14 determines whether cluster printing is permitted for Job 2. Cluster printing is defined as using two or more printers to print pages of the print job.

If cluster printing is permitted (S103: YES), then at block S104, main UI application 80D changes the sequential order or position of UI device panes and adds information to main UI 200.

In general, a print job can be assigned to one or more of the print production devices. Here, Job 2 is assigned to two print production devices (Printer 1 and Printer 3). The two print production devices comprises a specific print production device (Printer 3). Before receiving Job 2, the UI device pane of the specific print production device (Printer 3) has a position among the UI device panes which appear in a sequential order in the main UI. For example, the UI device pane of Printer 3 could be near the bottom of main UI 200 before Job 2 is received. After Job 2 is received, main UI application 80D can change the sequential order of the UI device panes in main UI 200 by moving the UI device pane of Printer 3 to a different position among the UI device panes. In FIG. 14 for example, cluster printing is permitted for Job 2 so that color pages can be printed in parallel with BW pages for faster completion time. Main UI application 80D changes the position of UI device panes 102 in FIG. 11 to the sequential order shown in FIG. 14. The positions are changed so that UI device panes 102 for Printer 1 and Printer 3 are next to each other.

In addition, main UI application 80D adds first option indicator 128A to show the user that the enclosed group (Printers 1 and 3) is an option for executing Job 2. Main UI application 80D adds job sequence indicator 130 to show the user that, if the user assigns Job 2 to the enclosed group, color printing by Printer 1 and BW printing by Printer 3 will be performed in parallel. The process proceeds to block S105.

If cluster printing is not permitted (S103: NO), server 14 may autonomously assign the received print job to an appropriate print production device, and the process may proceed from block S103 to S105.

At block S105, device microservices 120 update UI status in main UI 200. For example, when execution of Job 2 starts, print status 108 of Printers 1 and 3 may be updated by device microservices 120 from "Idle" in FIG. 14 to "Printing" in FIG. 15.

At block S106, main UI application 80D changes UI order or position and deletes information from main UI 200. For example, when execution of Job 2 is in progress, UI panes of Printers 1 and 3 and Job 2 appear at the top of main UI 200, as shown in FIG. 15. When execution of Job 2 is completed, main UI application 80D deletes information (assignment indicator, job sequence indicator, and UI pane) associated with Job 2. Next, execution of Job 3 begins, so main UI application 80D changes the position of the UI device panes so that the panes for Printer 1 and Finisher 1, which are assigned to Job 3, appear at the top of main UI 200.

Figure 19:
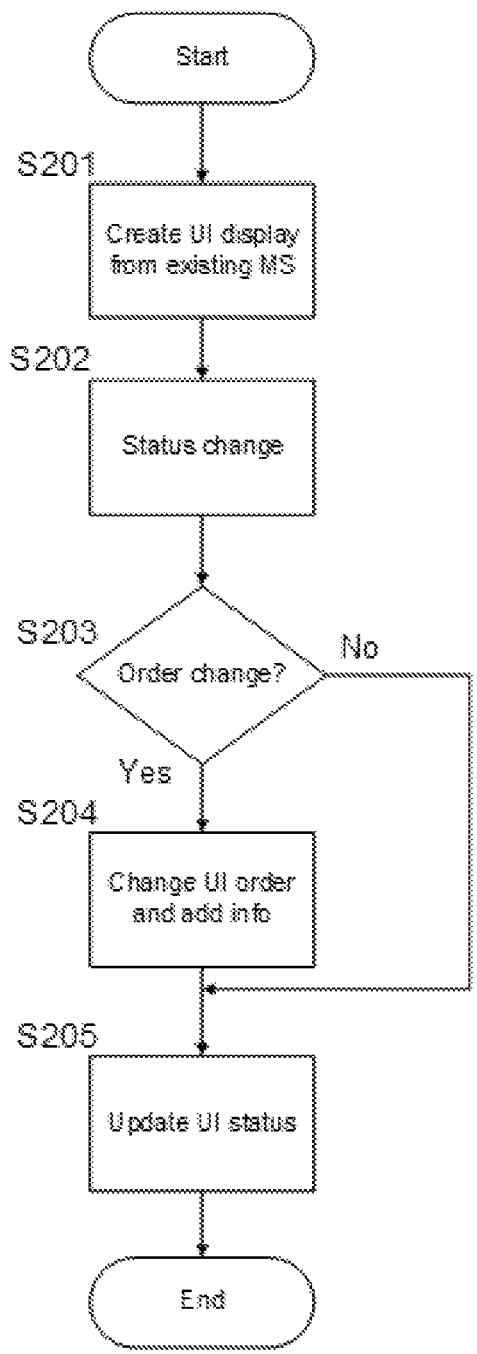

FIG. 19 shows an example method for print management visualization. At block S201, server 14 creates UI display from existing microservices. For example, server 14 uses device microservices 120 to create main UI 200 with device list 101 as shown in FIG. 11. At block S202, a status change occurs. For example, server 14 may detect a negative status in Printer 2 (an example of a first print production device). Examples of negative status include without limitation a paper jam, a service call alert, a paper supply outage, and a toner supply outage. Main UI application 80D receives from device microservice 120 of Printer 2 an updated UI device pane showing the negative status. In FIG. 12, Printer 2 is assigned to Job 5, and updated device pane 102 for Printer 2 shows "Paper Jam." The updated device pane is displayed in main UI 200 to alert the user.

At block S203, server 14 monitors of a device reassignment user instruction to reassign Printer 2 to another printer having capabilities that match the print process requirement (BW printing) of Job 5. Printer 3 (an example of a second print production device) has capabilities that match the print process requirement of Job 5. The device reassignment user instruction to reassign Printer 2 to Printer 3 can be in the form of a drag operation to move job pane 112 of Job 5 toward device pane 102 of Printer 3. When the device reassignment user instruction is received (S203: YES), the process proceeds to block S204, otherwise the process may proceed to block S205.

At block S204, main UI application 80D changes UI order and adds information to main UI 200. For example, UI device pane 102 of Printer 2 may be moved below that of Printer 3. Job assignment indicator 124 is removed from UI device pane 102 of Printer 2 and added to UI device pane 102 of Printer 3.

At block S205, device microservices 120 update UI status. For example, if no device reassignment user instruction is received (S203: NO) and then the paper jam is cleared by a maintenance person, device microservice 120 of Printer 2 may change the print status from "Paper Jam" to "Waiting." If a device reassignment user instruction is received (S203: YES) and execution of Job 5 begins, then device microservice 120 of Printer 3 may the change print status for Printer 3 to "Printing."

The details of UI device panes and the arrangement of device and job lists may vary from the illustrated examples. Such variations, as might be desired to meet specific user requirements or to accommodate new print production machines, may be developed and deployed with greater speed and reliability in the microservices-based framework described herein. Various microservices generate UI panes as building blocks. Information is applied to the UI panes to illustrate the relationship between print production devices and print jobs. Of course, the relationships of special interest to one user may differ from those of other users. Thus, the process of illustrating the relationships can be performed by one or more microservices, which may be tailored according to customer need with les time and cost compared to conventional print management programs.

While several particular forms of the invention have been illustrated and described, it will also be apparent that various modifications can be made without departing from the scope of the invention. It is also contemplated that various combinations or subcombinations of the specific features and aspects of the disclosed embodiments can be combined with or substituted for one another in order to form varying modes of the invention. Accordingly, it is not intended that the invention be limited, except as by the appended claims.

What is claimed is:

1. A print management visualization method comprising:
receiving, by a main UI application, UI device panes from a plurality of device microservices of a print management program, each device microservice corresponding to a different one of a plurality of print production devices, each UI device pane being a graphic showing print status information for the print production device corresponding to the device microservice from which the UI device pane is received;
causing, by the main UI application, display of a main UI comprising the UI device panes;
receiving a print job;
receiving, by the main UI application, a UI job list from a job management microservice, the UI job list comprising information about the print job;
causing, by the main UI application, the UI job list and an assignment indicator to be included in the displayed main UI, the assignment indicator provided by the main UI application and showing that the print job is assigned to one or more of the print production devices,
wherein the plurality of device microservices includes a first device microservice and a second device microservice, the UI device panes include a first UI device pane provided by the first device microservice to the main UI application and a second UI device pane provided by the second device microservice to the main UI application, the first device microservice is independent of the second device microservice such that the first device microservice may be disabled without an effect on the second microservice providing the second UI device pane to the main UI application.

2. The method of claim 1,
wherein the one or more of the print production devices assigned to the print job includes a specific print production device,
wherein, before receiving the print job, the UI device pane of the specific print production device has a position among the UI device panes which appear in a sequential order in the main UI, and
wherein the method further comprises, after receiving the print job:
changing, by the main UI application, the sequential order of the UI device panes in the main UI by moving the UI device pane of the specific print production device to a different position among the UI device panes.

3. The method of claim 1, further comprising:
determining, consistent with the information about the print job, whether the print job is a distributed print job to be executed by more than one of the print production devices,
wherein when it is determined that the print job is to be executed by more than one of the print production devices, the assignment indicator provided by the main UI application shows that the print job is assigned to a group of two or more of the print production devices.

4. The method of claim 3, further comprising:
when it is determined that the print job is to be executed by more than one of the print production devices, the displayed main UI comprises option indicators provided by the main UI application, wherein
the option indicators comprise a first option indicator and a second option indicator, the first option indicator identifies a first group of the print production devices as a first option for executing the print job, the second option indicator identifies a second group of the print production devices as a second option for executing the print job, the first option indicator excludes the print production devices in the second group, and the second option indicator excludes the print production devices in the first group.

5. The method of claim 3, further comprising:
when it is determined that the print job is to be executed by more than one of the print production devices, the displayed main UI comprises a job sequence indicator provided by the main UI application, the job sequence indicator showing a sequence in which the print job is to executed by the print production devices.

6. The method of claim 1, wherein the main UI application forms part of a first print server configured to manage the plurality of print production devices, the plurality of print production devices referred to as a first plurality of print production devices, the first plurality of print production devices located at a first site, and the method further comprises:
receiving, by a dashboard microservice, the UI device panes and a first UI job pane of the print job from the first print server;
receiving, by the dashboard microservice, performance information from the first print server, the performance information relating to the first plurality of print production devices, the performance information selected from the group consisting of job completion time information, job volume information, and print production device usage information;
generating, by the dashboard microservice, a performance pane based on the performance information from the first print server, the performance pane comprising a graphical representation of the performance information from the first print server;
receiving, by a cloud-based UI microservice, the UI device panes, the first UI job pane, and the performance pane from the dashboard microservice; and
causing, by the cloud-based UI microservice, display of a dashboard UI comprising the UI device panes, the first UI job pane, and the performance pane.

7. The method of claim 1, further comprising:
receiving a plurality of print jobs;
receiving, by the main UI application, a UI scheduling pane from a job scheduling microservice, the UI scheduling pane comprising a plurality of time lines, one for each of the print production devices, each time line indicating a sequence for executing one or more of the print jobs; and
causing, by the main UI application, display of a scheduling UI comprising the UI device panes and the UI scheduling pane,
wherein the plurality of the print jobs comprises a particular job assigned to a group of two or more of the print production devices, and the particular job appears simultaneously on two or more of the time lines of the displayed UI scheduling pane.

8. The method of claim 1, wherein the plurality of print production devices comprises a first print production device and a second print production device, the print job is assigned to the first print production device, and the method further comprises:
detecting a negative status in the first print production device;
receiving, by the main UI application from the device microservice corresponding to the first print production device, an updated UI device pane showing the negative status;
causing, by the main UI application, display of the updated UI device pane in the main UI;
monitoring for a device reassignment user instruction to reassign the print job to the second print production device; and
when the device reassignment user instruction is received, causing an assignment indicator from the main UI application to be displayed in the main UI, the assignment indicator showing reassignment of the print job to the second print production device.

9. A print management visualization method comprising:
receiving, by a main UI application, UI device panes from a plurality of device microservices, each device microservice corresponding to a different one of a plurality of print production devices, each UI device pane comprising print status information for the print production device corresponding to the device microservice from which the UI device pane is received;
causing, by the main UI application, display of a main UI comprising the UI device panes;
receiving a print job;
receiving, by the main UI application, a UI job list from a job management microservice, the UI job list comprising information about the print job;
causing, by the main UI application, the UI job list and an assignment indicator to be included in the displayed main UI, the assignment indicator provided by the main UI application and showing that the print job is assigned to one or more of the print production devices,
wherein the main UI application forms part of a first print server configured to manage the plurality of print production devices, the plurality of print production devices referred to as a first plurality of print production devices, the first plurality of print production devices located at a first site, and the method further comprises:

receiving, by a dashboard microservice, the UI device panes and a first UI job pane of the print job from the first print server;

receiving, by the dashboard microservice, performance information from the first print server, the performance information relating to the first plurality of print production devices, the performance information selected from the group consisting of job completion time information, job volume information, and print production device usage information;

generating, by the dashboard microservice, a performance pane based on the performance information from the first print server, the performance pane comprising a graphical representation of the performance information from the first print server;

receiving, by a cloud-based UI microservice, the UI device panes, the first UI job pane, and the performance pane from the dashboard microservice;

causing, by the cloud-based UI microservice, display of a dashboard UI comprising the UI device panes, the first UI job pane, and the performance pane;

receiving, by a second main UI application, UI device panes from a second plurality of device microservices, each device microservice corresponding to a different one of a second plurality of print production devices, each UI device pane comprising print status information for the print production device corresponding to the device microservice from which the UI device pane is received;

receiving a second print job to be executed by one or more of the second plurality of print production devices; and receiving, by the second main UI application from a second job management microservice, a second UI job pane of the second print job, the second UI job pane comprising information about the second print job, wherein the second main UI application forms part of a second print server configured to manage the second plurality of print production devices, the second plurality of print production devices located at a second site, and the method further comprises:

receiving, by the dashboard microservice, the UI device panes and the second UI job pane from the second print server; and receiving, by the dashboard microservice, performance information from the second print server, the performance information relating to the second plurality of print production devices, the performance information selected from the group consisting of job completion time information, job volume information, and print production device usage information, wherein the performance pane generated by the dashboard microservice is further based on the performance information from the second print server, the performance pane comprises a graphical representation of the performance information from the second print server, and the displayed dashboard UI further comprises the UI device panes of the second plurality of print production devices and the second UI job pane.

10. A print system having one or more print servers in communication with plural print production devices, the system executing a print management program to perform a print management visualization process comprising:

receiving, by a main UI application, UI device panes from a plurality of device microservices of the print management program, each device microservice corresponding to a different one of a plurality of print production devices, each UI device pane being a graphic showing print status information for the print production device corresponding to the device microservice from which the UI device pane is received;

causing, by the main UI application, display of a main UI comprising the UI device panes;

receiving a print job;

receiving, by the main UI application, a UI job list from a job management microservice, the UI job list comprising information about the print job;

causing, by the main UI application, the UI job list and an assignment indicator to be included in the displayed main UI, the assignment indicator provided by the main UI application and showing that the print job is assigned to one or more of the print production devices, wherein the plurality of device microservices includes a first device microservice and a second device microservice, the UI device panes include a first UI device pane provided by the first device microservice to the main UI application and a second UI device pane provided by the second device microservice to the main UI application, the first device microservice is independent of the second device microservice such that the first device microservice may be disabled without an effect on the second microservice providing the second UI device pane to the main UI application.

11. The system of claim 10, wherein in the print management visualization process, the one or more of the print production devices assigned to the print job includes a specific print production device, before receiving the print job, the UI device pane of the specific print production device has a position among the UI device panes which appear in a sequential order in the main UI, and wherein the print management visualization process further comprises, after receiving the print job:

changing, by the main UI application, the sequential order of the UI device panes in the main UI by moving the UI device pane of the specific print production device to a different position among the UI device panes.

12. The system of claim 10, wherein the print management visualization process further comprises:

determining, consistent with the information about the print job, whether the print job is a distributed print job to be executed by more than one of the print production devices, wherein when it is determined that the print job is to be executed by more than one of the print production devices, the assignment indicator provided by the main UI application shows that the print job is assigned to a group of two or more of the print production devices.

13. The system of claim 12, wherein the print management visualization process further comprises:

when it is determined that the print job is to be executed by more than one of the print production devices, the displayed main UI comprises option indicators provided by the main UI application, wherein the option indicators comprise a first option indicator and a second option indicator, the first option indicator identifies a first group of the print production devices as a first option for executing the print job, the second option indicator identifies a second group of the print production devices as a second option for executing the print job, the first option indicator excludes the print production devices in the second group, and the second option indicator excludes the print production devices in the first group.

14. The system of claim 12, wherein the print management visualization process further comprises:
when it is determined that the print job is to be executed by more than one of the print production devices, the displayed main UI comprises a job sequence indicator provided by the main UI application, the job sequence indicator showing a sequence in which the print job is to executed by the print production devices.

15. The system of claim 10, wherein the main UI application forms part of a first print server configured to manage the plurality of print production devices, the plurality of print production devices referred to as a first plurality of print production devices, the first plurality of print production devices located at a first site, and the print management visualization process further comprises:
receiving, by a dashboard microservice, the UI device panes and a first UI job pane of the print job from the first print server;
receiving, by the dashboard microservice, performance information from the first print server, the performance information relating to the first plurality of print production devices, the performance information selected from the group consisting of job completion time information, job volume information, and print production device usage information;
generating, by the dashboard microservice, a performance pane based on the performance information from the first print server, the performance pane comprising a graphical representation of the performance information from the first print server;
receiving, by a cloud-based UI microservice, the UI device panes, the first UI job pane, and the performance pane from the dashboard microservice; and
causing, by the cloud-based UI microservice, display of a dashboard UI comprising the UI device panes, the first UI job pane, and the performance pane.

16. The system of claim 10, wherein the print management visualization process further comprises:
receiving a plurality of print jobs;
receiving, by the main UI application, a UI scheduling pane from a job scheduling microservice, the UI scheduling pane comprising a plurality of time lines, one for each of the print production devices, each time line indicating a sequence for executing one or more of the print jobs; and
causing, by the main UI application, display of a scheduling UI comprising the UI device panes and the UI scheduling pane,
wherein the plurality of the print jobs comprises a particular job assigned to a group of two or more of the print production devices, and the particular job appears simultaneously on two or more of the time lines of the displayed UI scheduling pane.

17. The system of claim 10, wherein the plurality of print production devices comprises a first print production device and a second print production device, the print job is assigned to the first print production device, and the print management visualization process further comprises:
detecting a negative status in the first print production device;
receiving, by the main UI application from the device microservice corresponding to the first print production device, an updated UI device pane showing the negative status;
causing, by the main UI application, display of the updated UI device pane in the main UI;
monitoring for a device reassignment user instruction to reassign the print job to the second print production device; and
when the device reassignment user instruction is received, causing an assignment indicator from the main UI application to be displayed in the main UI, the assignment indicator showing reassignment of the print job to the second print production device.

18. A print system having one or more print servers in communication with plural print production devices, the system executing a print management program to perform a print management visualization process comprising:
receiving, by a main UI application, UI device panes from a plurality of device microservices, each device microservice corresponding to a different one of a plurality of print production devices, each UI device pane comprising print status information for the print production device corresponding to the device microservice from which the UI device pane is received;
causing, by the main UI application, display of a main UI comprising the UI device panes;
receiving a print job;
receiving, by the main UI application, a UI job list from a job management microservice, the UI job list comprising information about the print job; and
causing, by the main UI application, the UI job list and an assignment indicator to be included in the displayed main UI, the assignment indicator provided by the main UI application and showing that the print job is assigned to one or more of the print production devices,
wherein the main UI application forms part of a first print server configured to manage the plurality of print production devices, the plurality of print production devices referred to as a first plurality of print production devices, the first plurality of print production devices located at a first site, and the print management visualization process further comprises:
receiving, by a dashboard microservice, the UI device panes and a first UI job pane of the print job from the first print server;
receiving, by the dashboard microservice, performance information from the first print server, the performance information relating to the first plurality of print production devices, the performance information selected from the group consisting of job completion time information, job volume information, and print production device usage information;
generating, by the dashboard microservice, a performance pane based on the performance information from the first print server, the performance pane comprising a graphical representation of the performance information from the first print server;
receiving, by a cloud-based UI microservice, the UI device panes, the first UI job pane, and the performance pane from the dashboard microservice;
causing, by the cloud-based UI microservice, display of a dashboard UI comprising the UI device panes, the first UI job pane, and the performance pane;
receiving, by a second main UI application, UI device panes from a second plurality of device microservices, each device microservice corresponding to a different one of a second plurality of print production devices, each UI device pane comprising print status information for the print production device corresponding to the device microservice from which the UI device pane is received;

receiving a second print job to be executed by one or more of the second plurality of print production devices; and receiving, by the second main UI application from a second job management microservice, a second UI job pane of the second print job, the second UI job pane comprising information about the second print job, wherein the second main UI application forms part of a second print server configured to manage the second plurality of print production devices, the second plurality of print production devices located at a second site, and the print management visualization process further comprises:

receiving, by the dashboard microservice, the UI device panes and the second UI job pane from the second print server; and receiving, by the dashboard microservice, performance information from the second print server, the performance information relating to the second plurality of print production devices, the performance information selected from the group consisting of job completion time information, job volume information, and print production device usage information, wherein the performance pane generated by the dashboard microservice is further based on the performance information from the second print server, the performance pane comprises a graphical representation of the performance information from the second print server, and the displayed dashboard UI further comprises the UI device panes of the second plurality of print production devices and the second UI job pane.

19. A non-transitory computer readable medium having stored thereon computer readable instructions that, when executed by one or more computer processors of a print system, cause the print system to perform a print management visualization process, the print management visualization process comprising:

receiving, by a main UI application, UI device panes from a plurality of device microservices of a print management program, each device microservice corresponding to a different one of a plurality of print production devices, each UI device pane being a graphic showing print status information for the print production device corresponding to the device microservice from which the UI device pane is received;

causing, by the main UI application, display of a main UI comprising the UI device panes;

receiving a print job;

receiving, by the main UI application, a UI job list from a job management microservice, the UI job list comprising information about the print job;

causing, by the main UI application, the UI job list and an assignment indicator to be included in the displayed main UI, the assignment indicator provided by the main UI application and showing that the print job is assigned to one or more of the print production devices, wherein the plurality of device microservices includes a first device microservice and a second device microservice, the UI device panes include a first UI device pane provided by the first device microservice to the main UI application and a second UI device pane provided by the second device microservice to the main UI application, the first device microservice is independent of the second device microservice such that the first device microservice may be disabled without an effect on the second microservice providing the second UI device pane to the main UI application.

20. A non-transitory computer readable medium having stored thereon computer readable instructions that, when executed by one or more computer processors of a print system, cause the print system to perform a print management visualization process, the print management visualization process comprising:

receiving, by a main UI application, UI device panes from a plurality of device microservices, each device microservice corresponding to a different one of a plurality of print production devices, each UI device pane comprising print status information for the print production device corresponding to the device microservice from which the UI device pane is received;

causing, by the main UI application, display of a main UI comprising the UI device panes;

receiving a print job;

receiving, by the main UI application, a UI job list from a job management microservice, the UI job list comprising information about the print job;

causing, by the main UI application, the UI job list and an assignment indicator to be included in the displayed main UI, the assignment indicator provided by the main UI application and showing that the print job is assigned to one or more of the print production devices, wherein the main UI application forms part of a first print server configured to manage the plurality of print production devices, the plurality of print production devices referred to as a first plurality of print production devices, the first plurality of print production devices located at a first site, and the print management visualization process further comprises:

receiving, by a dashboard microservice, the UI device panes and a first UI job pane of the print job from the first print server;

receiving, by the dashboard microservice, performance information from the first print server, the performance information relating to the first plurality of print production devices, the performance information selected from the group consisting of job completion time information, job volume information, and print production device usage information;

generating, by the dashboard microservice, a performance pane based on the performance information from the first print server, the performance pane comprising a graphical representation of the performance information from the first print server;

receiving, by a cloud-based UI microservice, the UI device panes, the first UI job pane, and the performance pane from the dashboard microservice; and causing, by the cloud-based UI microservice, display of a dashboard UI comprising the UI device panes, the first UI job pane, and the performance pane;

receiving, by a second main UI application, UI device panes from a second plurality of device microservices, each device microservice corresponding to a different one of a second plurality of print production devices, each UI device pane comprising print status information for the print production device corresponding to the device microservice from which the UI device pane is received;

receiving a second print job to be executed by one or more of the second plurality of print production devices; and receiving, by the second main UI application from a second job management microservice, a second UI job pane of the second print job, the second UI job pane comprising information about the second print job, wherein the second main UI application forms part of a second print server configured to manage the second plurality of print production devices, the second plurality of print production devices located at a second site, and the print management visualization process further comprises:

receiving, by the dashboard microservice, the UI device panes and the second UI job pane from the second print server; and receiving, by the dashboard microservice, performance information from the second print server, the performance information relating to the second plurality of print production devices, the performance information selected from the group consisting of job completion time information, job volume information, and print production device usage information, wherein the performance pane generated by the dashboard microservice is further based on the performance information from the second print server, the performance pane comprises a graphical representation of the performance information from the second print server, and the displayed dashboard UI further comprises the UI device panes of the second plurality of print production devices and the second UI job pane.

* * * * *